United States Patent
Jiang et al.

(10) Patent No.: US 11,870,626 B1
(45) Date of Patent: Jan. 9, 2024

(54) MULTI-CLUSTER LOW PEAK TO AVERAGE POWER RATIO WAVEFORM DESIGN

(71) Applicant: QUALCOMM Incorporated, San Diego, CA (US)

(72) Inventors: Jing Jiang, San Diego, CA (US); Jing Sun, San Diego, CA (US); Seyedkianoush Hosseini, San Diego, CA (US); Zhifei Fan, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/872,984

(22) Filed: Jul. 25, 2022

(51) Int. Cl.
*H04L 27/26* (2006.01)
*H04W 72/0453* (2023.01)
*H04L 5/00* (2006.01)

(52) U.S. Cl.
CPC ........ *H04L 27/26025* (2021.01); *H04L 5/005* (2013.01); *H04L 27/265* (2013.01); *H04W 72/0453* (2013.01)

(58) Field of Classification Search
CPC . H04L 27/26025; H04L 5/005; H04L 27/265; H04W 72/0453
See application file for complete search history.

(56) References Cited

U.S. PATENT DOCUMENTS

| | | | | |
|---|---|---|---|---|
| 7,948,944 | B2 * | 5/2011 | Li | H04L 5/0064 370/330 |
| 8,687,575 | B2 * | 4/2014 | Takaoka | H04L 27/0008 370/329 |
| 2012/0320852 | A1 * | 12/2012 | Seo | H04L 1/0041 370/329 |
| 2014/0219239 | A1 * | 8/2014 | Li | H04L 5/006 370/330 |
| 2015/0110031 | A1 * | 4/2015 | Takeda | H04W 72/23 370/329 |

(Continued)

OTHER PUBLICATIONS

International Search Report and Written Opinion—PCT/US2023/027070—ISA/EPO—dated Oct. 31, 2023.

(Continued)

*Primary Examiner* — Khanh C Tran
(74) *Attorney, Agent, or Firm* — Holland & Hart LLP

(57) ABSTRACT

Methods, systems, and devices for wireless communications are described. A wireless device allocated two sets of non-contiguous frequency domain resources may divide a set of modulation symbols associated with a codeword into two subsets of modulation symbols. The wireless device may map the two subsets of modulation symbols into two sets of pre-discrete Fourier transform (DFT) resource elements (REs). The wireless device may pad the pre-DFT REs according to a block based scheme or a comb based scheme. The wireless device may perform a first DFT on the first set of pre-DFT REs and a second DFT on the second set of pre-DFT REs to generate first and second sets of frequency domain samples. The wireless device may perform an inverse fast Fourier transform on the first and second sets of frequency domain samples to generate a time domain waveform that may have a low peak to average power ratio.

30 Claims, 21 Drawing Sheets

(56) References Cited

U.S. PATENT DOCUMENTS

2019/0068424 A1* 2/2019 Park .................. H04L 5/0007
2019/0379495 A1 12/2019 Manolakos et al.

OTHER PUBLICATIONS

Qualcomm Incorporated: "Discussion on SRS Design," 3GPP TSG RAN WG1 Meeting #89, R1-1708600, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017, May 14, 2017, XP051273791, pp. 1-11, Sections 1, 2.1, 2.2, 2.4, 2.5, 2.7-2.9, Paragraph [02.9].

ZTE: "Discussion on UL DMRS Enhancement for eFD-MIMO", 3GPP TSG RAN WG1 Meeting #84bis, R1-162347, Discussion on UL Dmrs Enhancement for EFD-MIMO_FINAL, 3rd Generation Partnership Project (3GPP), Mobile Competence Centre, 650, Route Des Lucioles, F-06921 Sophia-Antipolis CED vol. RAN WG1, No. Busan, Korea, Apr. 11, 2016-Apr. 15, 2016, pp. 1-3, Apr. 2, 2016, XP051080126, Paragraph [02.1].

* cited by examiner

MULTI-CLUSTER LOW PEAK TO AVERAGE POWER RATIO WAVEFORM DESIGN

FIELD OF TECHNOLOGY

The following relates to wireless communications, including multi-cluster low peak to average power ratio waveform design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-cluster low peak to average power ratio (PAPR) waveform design. A transmitting wireless device may be allocated two (or more) sets of non-contiguous frequency domain resources on which to transmit data. The transmitting wireless device may obtain a set of modulation symbols associated with a codeword to be transmitted on the allocated sets of non-contiguous frequency domain resources. The transmitting wireless devices may then divide the set of modulation symbols into two subsets of modulation symbols. The wireless device may map the two subsets of modulation symbols into two respective sets of pre-discrete Fourier transform (DFT) resource elements. The wireless device may pad the pre-DFT resource elements, for example according to one of either a block based scheme or a comb based scheme. The padding may be zero-power symbols when the transmitter is a UE or a network entity. The wireless device may then perform a first DFT on the first set of pre-DFT resource elements to generate a first set of frequency domain samples associated with a first set of frequency resources and perform a second DFT on the second set of pre-DFT resource elements to generate a second set of frequency domain samples associated with a second set of frequency resources. The wireless device may then perform an inverse fast Fourier transform (IFFT) on the first and second sets of frequency domain samples to generate a time domain waveform. The time domain waveform may be transmitted and have relatively lower PAPR. A receiving device may perform inverse processes (e.g., a fast Fourier transform (FFT) followed by two inverse DFTs) to extract the first and second subsets of modulation symbols from the time domain waveform, and accordingly extract the modulation symbols associated with the codeword.

A method for wireless communications at a wireless device is described. The method may include obtaining a set of modulation symbols associated with a codeword, the set of modulation symbols including a first subset of modulation symbols and a second subset of modulation symbols, performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols, performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols, performing an IFFT on the first set of frequency domain samples and the second set of frequency domain samples to generate a time domain waveform, and transmitting the time domain waveform on the first set of frequency resources and the second set of frequency resources.

An apparatus for wireless communications at a wireless device is described. The apparatus may include a processor, memory coupled with the processor, and instructions stored in the memory. The instructions may be executable by the processor to cause the apparatus to obtain a set of modulation symbols associated with a codeword, the set of modulation symbols including a first subset of modulation symbols and a second subset of modulation symbols, perform a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols, perform a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols, perform an inverse FFT on the first set of frequency domain samples and the second set of frequency domain samples to generate a time domain waveform, and transmit the time domain waveform on the first set of frequency resources and the second set of frequency resources.

Another apparatus for wireless communications at a wireless device is described. The apparatus may include means for obtaining a set of modulation symbols associated with a codeword, the set of modulation symbols including a first subset of modulation symbols and a second subset of modulation symbols, means for performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols, means for performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols, means for performing an inverse FFT on the first set of frequency domain samples and the second set of frequency domain samples to generate a time domain waveform, and means for transmitting the time domain waveform on the first set of frequency resources and the second set of frequency resources.

A non-transitory computer-readable medium storing code for wireless communications at a wireless device is described. The code may include instructions executable by a processor to obtain a set of modulation symbols associated with a codeword, the set of modulation symbols including a first subset of modulation symbols and a second subset of modulation symbols, perform a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols, perform a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols, perform an IFFT on the first set of frequency domain samples and the second set of frequency domain samples to generate a time domain waveform, and transmit the time domain waveform on the first set of frequency resources and the second set of frequency resources.

In some examples of the method, apparatuses, and non-transitory computer-readable medium described herein, mapping, for the first DFT, the first subset of modulation symbols to a first block of resource elements and the first set of substitute modulation symbols to a second block of resource elements and mapping, for the second DFT, the second set of substitute modulation symbols to the first block and the second subset of modulation symbols to the second block.

In some examples of the method, apparatuses, and non-transitory computer-readable medium described herein, mapping, for the first DFT, the first subset of modulation symbols to odd-indexed resource elements and the first set of substitute modulation symbols to even-indexed resource elements and mapping, for the second DFT, the second set of substitute modulation symbols to the odd-indexed resource elements and the second subset of modulation symbols to the even-indexed resource elements.

In some examples of the method, apparatuses, and non-transitory computer-readable medium described herein, mapping, for the first DFT, the first subset of modulation symbols to a first set of resource elements that may be interleaved with a second set of resource elements for the first set of substitute modulation symbols and mapping, for the second DFT, the second set of substitute modulation symbols to the first set of resource elements and the second subset of modulation symbols to the second set of resource elements.

In some examples of the method, apparatuses, and non-transitory computer-readable medium described herein, the first set of substitute modulation symbols and the second set of substitute modulation symbols include zero power modulation symbols.

In some examples of the method, apparatuses, and non-transitory computer-readable medium described herein, the time domain waveform may be transmitted to a second wireless device, the first set of substitute modulation symbols may be associated with a transmission to a third wireless device, and the second set of substitute modulation symbols may be associated with the transmission to the third wireless device.

In some examples of the method, apparatuses, and non-transitory computer-readable medium described herein, the first subset of modulation symbols includes a different number of modulation symbols than the second subset of modulation symbols.

In some examples of the method, apparatuses, and non-transitory computer-readable medium described herein, performing the first DFT and performing the second DFT may include operations, features, means, or instructions for performing the first DFT associated with a number of points and the second DFT associated with the number of points, the number of points equal to a number of modulation symbols of the set of modulation symbols.

In some examples of the method, apparatuses, and non-transitory computer-readable medium described herein, the wireless device may be a user equipment (UE) and the method, apparatuses, and non-transitory computer-readable medium may include further operations, features, means, or instructions for transmitting UE capability signaling indicating a capability of the UE to perform the first DFT and the second DFT for frequency resources separated in frequency and receiving, at least in part in response to the UE capability signaling, control signaling indicating a configuration for performing the first DFT and the second DFT for the frequency resources.

Some examples of the method, apparatuses, and non-transitory computer-readable medium described herein may further include operations, features, means, or instructions for receiving, from a UE, UE capability signaling indicating a capability of the UE to perform a first inverse DFT and a second inverse DFT for frequency resources separated in frequency and transmitting, at least in part in response to the UE capability signaling, control signaling indicating a configuration for performing the first inverse DFT and the second inverse DFT for the frequency resources.

In some examples of the method, apparatuses, and non-transitory computer-readable medium described herein, the time domain waveform includes a DFT spread frequency division multiplexing waveform.

A method for wireless communications at a wireless device is described. The method may include receiving a time domain waveform on a first set of frequency resources and a second set of frequency resources, the second set of frequency resources separated in frequency from the first set of frequency resources, performing, on the time domain waveform, an FFT to obtain a first set of frequency domain samples associated with the first set of frequency resources and a second set of frequency domain samples associated with the second set of frequency resources, performing a first inverse DFT on the first set of frequency domain samples to generate a first set of modulation symbols, performing a second inverse DFT on the second set of frequency domain samples to generate a second set of modulation symbols, and obtaining a third set of modulation symbols associated with a codeword, the third set of modulation symbols including a first subset of modulation symbols extracted from the first set of modulation symbols and a second subset of modulation symbols extracted from the second set of modulation symbols.

An apparatus for wireless communications at a wireless device is described. The apparatus may include a processor, memory coupled with the processor, and instructions stored in the memory. The instructions may be executable by the processor to cause the apparatus to receive a time domain waveform on a first set of frequency resources and a second set of frequency resources, the second set of frequency resources separated in frequency from the first set of frequency resources, perform, on the time domain waveform, an FFT to obtain a first set of frequency domain samples associated with the first set of frequency resources and a second set of frequency domain samples associated with the second set of frequency resources, perform a first inverse DFT on the first set of frequency domain samples to generate a first set of modulation symbols, perform a second inverse DFT on the second set of frequency domain samples to generate a second set of modulation symbols, and obtain a third set of modulation symbols associated with a codeword, the third set of modulation symbols including a first subset of modulation symbols extracted from the first set of modulation symbols and a second subset of modulation symbols extracted from the second set of modulation symbols.

Another apparatus for wireless communications at a wireless device is described. The apparatus may include means for receiving a time domain waveform on a first set of frequency resources and a second set of frequency resources, the second set of frequency resources separated in frequency from the first set of frequency resources, means for performing, on the time domain waveform, an FFT to obtain a first set of frequency domain samples associated with the first set of frequency resources and a second set of frequency domain samples associated with the second set of frequency resources, means for performing a first inverse DFT on the first set of frequency domain samples to generate a first set of modulation symbols, means for performing a second inverse DFT on the second set of frequency domain samples to generate a second set of modulation symbols, and means for obtaining a third set of modulation symbols associated with a codeword, the third set of modulation symbols including a first subset of modulation symbols extracted from the first set of modulation symbols and a second subset of modulation symbols extracted from the second set of modulation symbols.

A non-transitory computer-readable medium storing code for wireless communications at a wireless device is described. The code may include instructions executable by a processor to receive a time domain waveform on a first set of frequency resources and a second set of frequency resources, the second set of frequency resources separated in frequency from the first set of frequency resources, perform, on the time domain waveform, an FFT to obtain a first set of frequency domain samples associated with the first set of frequency resources and a second set of frequency domain samples associated with the second set of frequency resources, perform a first inverse DFT on the first set of frequency domain samples to generate a first set of modulation symbols, perform a second inverse DFT on the second set of frequency domain samples to generate a second set of modulation symbols, and obtain a third set of modulation symbols associated with a codeword, the third set of modulation symbols including a first subset of modulation symbols extracted from the first set of modulation symbols and a second subset of modulation symbols extracted from the second set of modulation symbols.

Some examples of the method, apparatuses, and non-transitory computer-readable medium described herein may further include operations, features, means, or instructions for extracting, from the first set of modulation symbols, the first subset of modulation symbols from a first block of resource elements and extracting, from the second set of modulation symbols, the second subset of modulation symbols a second block of resource elements.

Some examples of the method, apparatuses, and non-transitory computer-readable medium described herein may further include operations, features, means, or instructions for extracting, from the first set of modulation symbols, the first subset of modulation symbols from odd-indexed resource elements and extracting, from the second set of modulation symbols, the second subset of modulation symbols from even-indexed resource elements.

Some examples of the method, apparatuses, and non-transitory computer-readable medium described herein may further include operations, features, means, or instructions for extracting, from the first set of modulation symbols, the first subset of modulation symbols from a first set of resource elements that may be interleaved with a second set of resource elements and extracting, from the second set of modulation symbols, the second subset of modulation symbols from the second set of resource elements that may be interleaved with the first set of resource elements.

In some examples of the method, apparatuses, and non-transitory computer-readable medium described herein, the first set of modulation symbols further includes a first set of substitute modulation symbols that include zero power modulation symbols and the second set of modulation symbols further includes a second set of substitute modulation symbols that include zero power modulation symbols.

In some examples of the method, apparatuses, and non-transitory computer-readable medium described herein, the first set of modulation symbols further includes a first set of substitute modulation symbols associated with a different receiving wireless device and the second set of modulation symbols further includes a second set of substitute modulation symbols associated with the different receiving wireless device.

In some examples of the method, apparatuses, and non-transitory computer-readable medium described herein, the first subset of modulation symbols includes a different number of modulation symbols than the second subset of modulation symbols.

In some examples of the method, apparatuses, and non-transitory computer-readable medium described herein, both the first inverse DFT and the second inverse DFT may be associated with a number of points, and the number of points may be equal to a number of modulation symbols of the third set of modulation symbols.

In some examples of the method, apparatuses, and non-transitory computer-readable medium described herein, the wireless device may be a network entity and the method, apparatuses, and non-transitory computer-readable medium may include further operations, features, means, or instructions for receiving UE capability signaling indicating a capability of a UE to perform a first DFT and a second DFT for frequency resources separated in frequency and transmitting, at least in part in response to the UE capability signaling, control signaling indicating a configuration for the UE to perform the first DFT and the second DFT for the frequency resources.

In some examples of the method, apparatuses, and non-transitory computer-readable medium described herein, the wireless device may be a UE and the method, apparatuses, and non-transitory computer-readable medium may include further operations, features, means, or instructions for transmitting, to a network entity, UE capability signaling indicating a capability of the UE to perform the first inverse DFT and the second inverse DFT for frequency resources separated in frequency and receiving, based at least in part in response to the UE capability signaling, control signaling indicating a configuration for performing the first inverse DFT and the second inverse DFT for the frequency resources.

In some examples of the method, apparatuses, and non-transitory computer-readable medium described herein, the time domain waveform includes a DFT spread frequency division multiplexing waveform.

DETAILED DESCRIPTION

Figure 1:
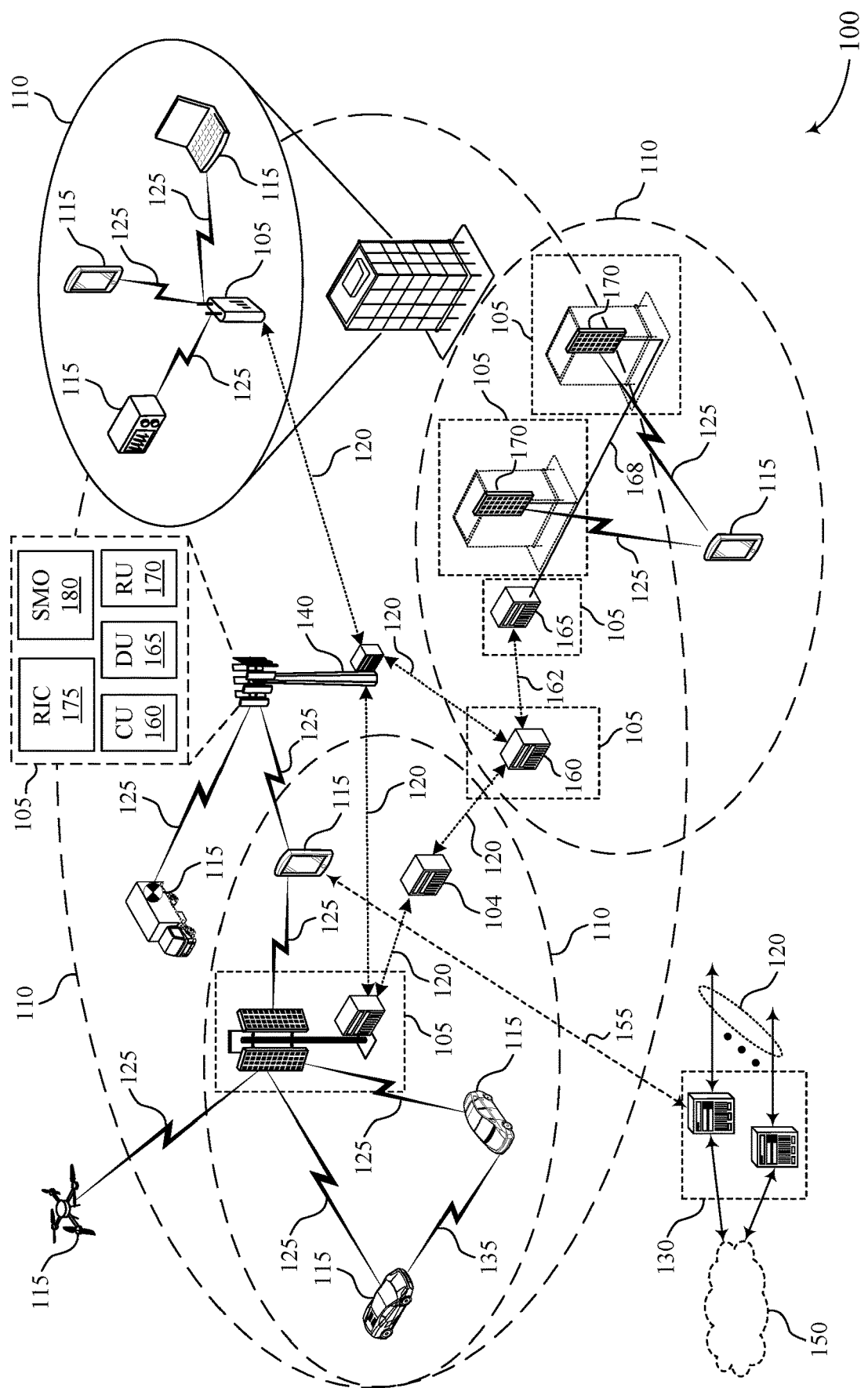
FIG. 1 illustrates an example of a wireless communications system that supports multi-cluster low peak to average power ratio waveform design in accordance with one or more aspects of the present disclosure.

In some wireless communications systems, non-contiguous frequency domain resource allocations may be used for some use cases. Non-contiguous frequency domain resource allocations include two or more sets of frequency allocations that are separated in frequency (i.e., that have one or more unallocated frequency resources between the sets). Some use cases may include uplink carrier aggregation, multi-carrier sounding reference signals (SRS), multi-carrier physical uplink shared channel (PUSCH) transmissions, or multi-carrier physical uplink control channel (PUCCH) transmissions. Additional example use cases may include unlicensed spectrum where multiple frequency cluster waveforms may be used, and multi-cluster sequence designs (e.g., for SRS, PUCCH, or PUSCH). Discrete Fourier transform (DFT) spread frequency domain multiplexing (s-FDM) based schemes may have sub-optimal peak to average power ratios (PAPRs), however, when applied to non-contiguous frequency domain resource allocations (e.g., multiple frequency domain clusters).

Aspects of the present disclosure relate to low PAPR waveform design for non-contiguous frequency domain resources. A transmitting wireless device (e.g., a user equipment (UE) for uplink or sidelink, or a network entity for downlink), may be allocated two (or more) sets of non-contiguous frequency domain resources on which to transmit data (e.g., associated with a codeword). The wireless device may obtain a set of modulation symbols associated with the codeword and divide the set of modulation symbols into two (or more) subsets of modulation symbols. The wireless device may map the two (or more) subsets of modulation symbols into two (or more) respective sets of pre-DFT resource elements. The wireless device may pad the pre-DFT resource elements, for example according to one of either a block based scheme or a comb based scheme. The padding may be zero-power symbols when the transmitter is a UE or a network entity. For a network entity, the padding may be symbols for a different recipient UE (e.g., using multiple-user (MU) multiple-input multiple-output (MIMO) communications). For example, in the first set of pre-DFT resource elements, the wireless device may map the first subset of modulation symbols into a contiguous block or comb of pre-DFT resource elements and zero pad the remaining pre-DFT resource elements. In the second set of pre-DFT resource elements, the wireless device may map the second subset of modulation symbols to a second contiguous block or comb of pre-DFT resource elements and zero pad the remaining pre-DFT resource elements. The wireless device may then perform a first DFT on the first set of pre-DFT resource elements to generate a first set of frequency domain samples associated with a first set of frequency resources, and perform a second DFT on the second set of pre-DFT resource elements to generate a second set of frequency domain samples associated with a second set of frequency resources. The wireless device may then perform an inverse fast Fourier transform (IFFT) on the first and second sets of frequency domain samples to generate a time domain waveform. The time domain waveform may be transmitted and have relatively lower PAPR.

A receiving device (e.g., a network entity in uplink or a UE in downlink or sidelink) may perform inverse processes (e.g., a fast Fourier transform (FFT) followed by two inverse DFTs) to extract the first and second subsets of modulation symbols from the time domain waveform, and accordingly extract the modulation symbols associated with the codeword.

Aspects of the disclosure are initially described in the context of wireless communications systems. Aspects of the disclosure are further illustrated by and described with reference to resource mappings, coding schemes, and process flows. Aspects of the disclosure are further illustrated by and described with reference to apparatus diagrams, system diagrams, and flowcharts that relate to multi-cluster low PAPR waveform design.

FIG. 1 illustrates an example of a wireless communications system 100 that supports multi-cluster low PAPR waveform design in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-cluster low PAPR waveform design as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support a diverse set of use cases. Waveforms and multiple access design for the wireless communications system 100 may accordingly support a variety of use cases, including, for example, mobile broadband, metaverse, massive IoT, sidelink, massive spectrum aggregation or duplexing, and UE cooperation. Waveforms and multiple access design may include full duplex, RF sensing, positioning, and PHY security, and enhanced MIMO. In some examples, non-contiguous frequency domain resource allocations may be used for some use cases, including uplink carrier aggregation, multi-carrier SRS, multi-carrier PUSCH transmissions, or multi-carrier PUCCH transmissions, unlicensed spectrum where multiple frequency cluster waveforms may be used, and multi-cluster sequence designs (e.g., for SRS, PUCCH, or PUSCH). Considerations for low PAPR multi-cluster or carrier waveform may include multi frequency cluster or carrier simultaneous transmission, joint design across multiple frequency clusters to achieve lower PAPR, efficient multi-user access multiplexing of different users, and low latency (intra-symbol) and high reliability (diversity).

A transmitting wireless device (e.g., a UE 115 for uplink or sidelink, or network entity 105 for downlink), may be allocated two (or more) sets of non-contiguous frequency domain resources on which to transmit data (e.g., associated with a codeword). The wireless device may obtain a set of M modulation symbols associated with the codeword and divide the set of modulation symbols into two subsets of modulation symbols. The wireless device may map the two subsets of modulation symbols into two respective sets of M pre-DFT resource elements. The wireless device may pad the pre-DFT resource elements, for example according to one of either a block based scheme or a comb based scheme. The padding may be zero-power symbols when the transmitter is a UE 115 or a network entity 105. For a network entity 105, the padding may be symbols for a different recipient UE 115. For example, in the first set of pre-DFT resource elements, the wireless device may map the first subset of n modulation symbols into a contiguous block or comb of pre-DFT resource elements and zero pad the remaining (M−n) pre-DFT resource elements. In the second set of pre-DFT resource elements, the wireless device may map the second subset of (M−n) modulation symbols to a block or comb of pre-DFT resource elements and zero pad the remaining n pre-DFT resource elements. The wireless device may then perform a first DFT on the first set of pre-DFT resource elements to generate a first set of frequency domain samples associated with a first set of frequency resources and perform a second DFT on the second set of pre-DFT resource elements to generate a second set of frequency domain samples associated with a second set of frequency resources. The wireless device may then perform an IFFT on the first and second sets of frequency domain samples to generate a time domain waveform. The time domain waveform may be transmitted, and may have relatively lower PAPR than communications that do not use the multi-cluster waveform design described here.

A receiving device (e.g., a network entity 105 in uplink or a UE 115 in downlink or sidelink) may perform inverse processes (e.g., an FFT followed by two inverse DFTs) to extract the first and second subsets of modulation symbols from the time domain waveform, and accordingly extract the modulation symbols associated with the codeword.

Figure 2:
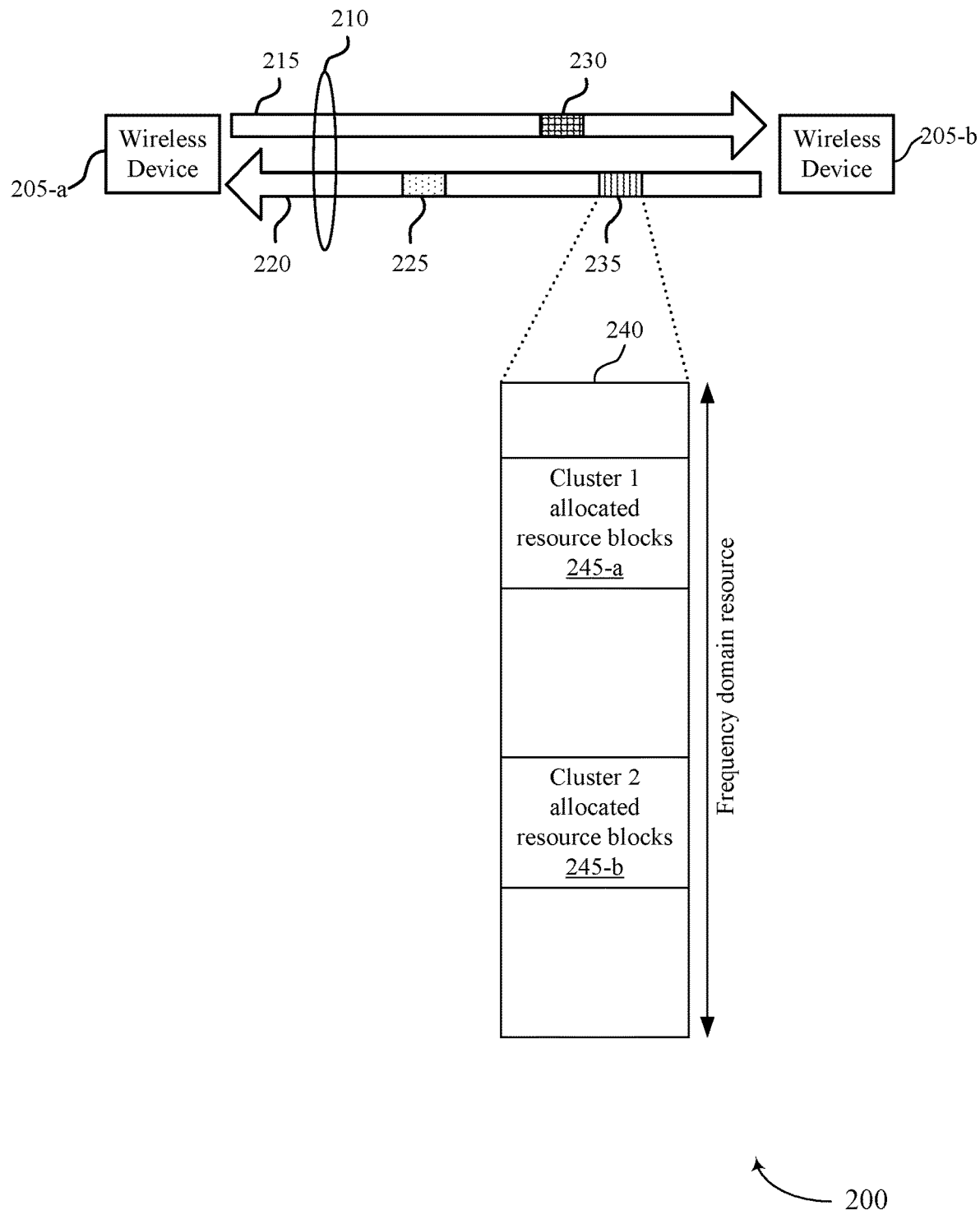
FIG. 2 illustrates an example of a wireless communications system that supports multi-cluster low peak to average power ratio waveform design in accordance with one or more aspects of the present disclosure.

FIG. 2 illustrates an example of a wireless communications system 200 that supports multi-cluster low PAPR waveform design in accordance with one or more aspects of the present disclosure. In some examples, the wireless communications system 200 may implement aspects of the wireless communications system 100 or may be implemented by aspects of the wireless communications system 100. For example, the wireless communications system 200 may include a wireless device 205-*a* and a wireless device 205-*b*, which may be examples of UEs 115 or network entities 105 as described herein.

The wireless device 205-*a* may communicate with the wireless device 205-*b* using a communication link 210. In some cases, the wireless device 205-*a* may be a network entity 105 and the wireless device 205-*b* may be a UE 115, and the communication link 210 may be an example of an NR or LTE link between the wireless device 205-*a* and the wireless device 205-*b*. In some examples, where the wireless device 205-*a* may be a network entity 105 and the wireless device 205-*b* may be a UE 115, the communication link 210 may include a bi-directional link that enables both uplink and downlink communication. For example, the wireless device 205-*b* may transmit uplink signals 220, such as uplink control signals or uplink data signals, to the wireless device 205-*a* using the communication link 210 and the wireless device 205-*a* may transmit downlink signals 215, such as downlink control signals or downlink data signals, to the wireless device 205-*b* using the communication link 210. In some cases, the wireless device 205-*a* may be a UE 115 and the wireless device 205-*b* may be a UE 115, and the communication link 210 may be a sidelink communication link. A sidelink communication link may include a bi-directional link that enables the wireless device 205-*b* to transmit signals to the wireless device 205-*a* and enables the wireless device 205-*a* to transmit signals to the wireless device 205-*b*.

In some examples, where the wireless device 205-*b* may be a UE 115 and the wireless device 205-*a* may be a network entity 105, the wireless device 205-*b* may transmit, to the wireless device 205-*a*, UE capability signaling 225 indicating a capability of the wireless device 205-*b* to perform a first inverse DFT and a second inverse DFT for frequency resources separated in frequency. In such examples, the wireless device 205-*a* may transmit, to the wireless device 205-*b* in response to the UE capability signaling 225, control signaling 230 indicating a configuration for performing a first inverse DFT and a second inverse DFT for frequency resources (e.g., the first set of frequency resources 245-*a* and the second set of frequency resources 245-*b*) allocated to the wireless device 205-*b*.

The wireless device 205-*b* may obtain a set of M modulation symbols associated with a codeword, the set of M modulation symbols including a first subset of n modulation symbols and a second subset of (M−n) modulation symbols. The wireless device 205-*b* may be allocated (e.g., via control signaling 230), frequency resources in the frequency domain resources 240, the allocated frequency resources including the first set of frequency resources 245-*a* and the second set of frequency resources 245-*b*. The first set of frequency resources 245-*a* and the second set of frequency resources 245-*b* may be non-contiguous (e.g., have unallocated frequency resources between the sets).

The wireless device 205-*b* may perform a first DFT on a second set of M modulation symbols to generate a first set of frequency domain samples associated with the first set of frequency resources 245-*a* allocated to the wireless device 205-*b*, the second set of modulation symbols including the first subset of n modulation symbols and a first set of (M−n) substitute modulation symbols replacing the second subset of modulation symbols. The wireless device 205-*b* may perform a second DFT on a third set of M modulation symbols to generate a second set of frequency domain samples associated with the second set of frequency resources 245-*b* allocated to the wireless device 205-*b*, the third set of modulation symbols including the second subset of (M−n) modulation symbols and a second set of n substitute modulation symbols replacing the first subset of modulation symbols. The wireless device may pad the pre-DFT resource elements of the first and second sets of substitute modulation symbols, for example according to one of either a block based scheme or a comb based scheme. The padding may be zero-power symbols when the wireless device 205-*b* is a UE 115 or a network entity 105. If the wireless device 205-*b* is a network entity 105, the padding may be symbols for a different recipient UE 115.

For example, in the first set of pre-DFT resource elements, the wireless device 205-*b* may map the first subset of n modulation symbols into a contiguous block or comb of pre-DFT resource elements and zero pad the remaining (M−n) pre-DFT resource elements. In the second set of pre-DFT resource elements, the wireless device 205-*b* may map the second subset of (M−n) modulation symbols to a block or comb of pre-DFT resource elements and zero pads the remaining n pre-DFT resource elements. The wireless device 205-*b* may then perform a first DFT on the first set of pre-DFT resource elements to generate a first set of frequency domain samples associated with the first set of frequency resources 245-*a* and perform a second DFT on the second set of pre-DFT resource elements to generate a second set of frequency domain samples associated with the second set of frequency resources 245-*b*. The wireless device 205-*b* may then perform an IFFT on the first and second sets of frequency domain samples to generate a time domain waveform 235. The time domain waveform 235 may be transmitted by the wireless device 205-*b* and have a relatively low PAPR.

The wireless device 205-*a* may perform inverse processes (e.g., an FFT followed by two inverse DFTs) to extract the first and second subsets of modulation symbols from the time domain waveform 235, and accordingly extract the modulation symbols associated with the codeword.

Figure 3A:
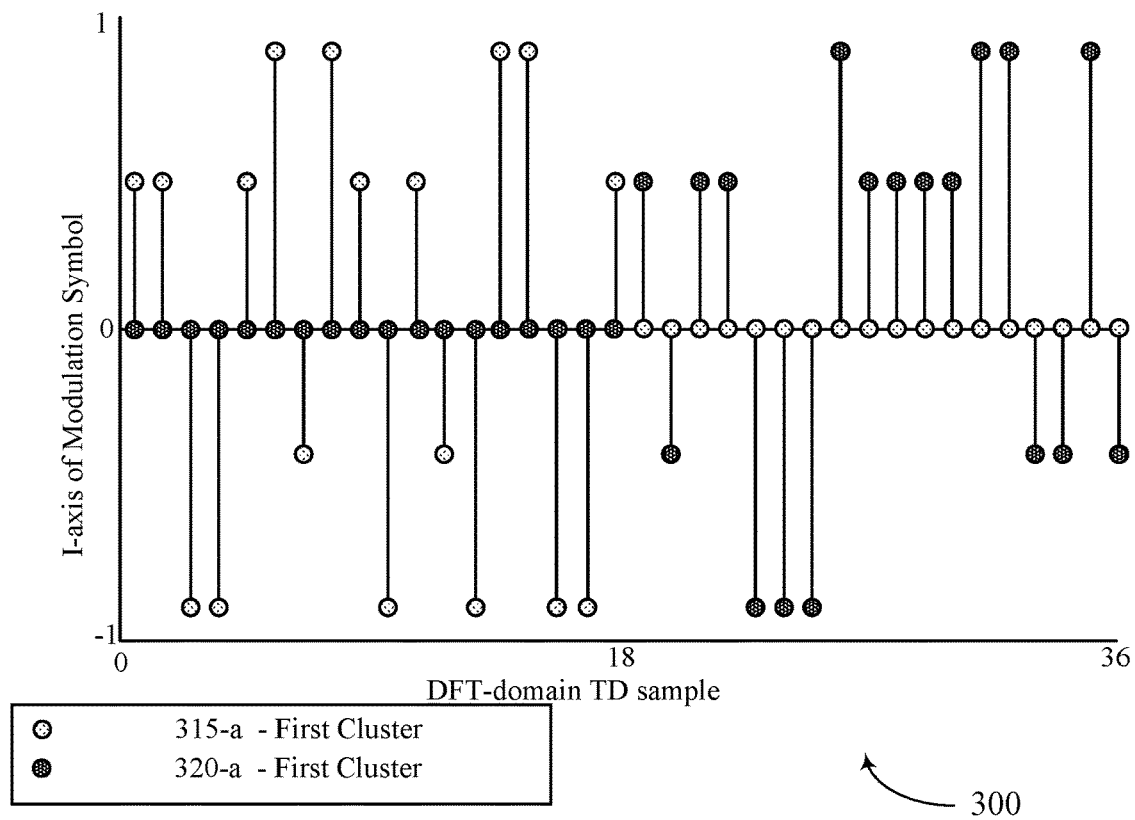
FIGS. 3a and 3b illustrate an example of a resource mappings that support multi-cluster low peak to average power ratio waveform design in accordance with one or more aspects of the present disclosure.
Figure 3B:
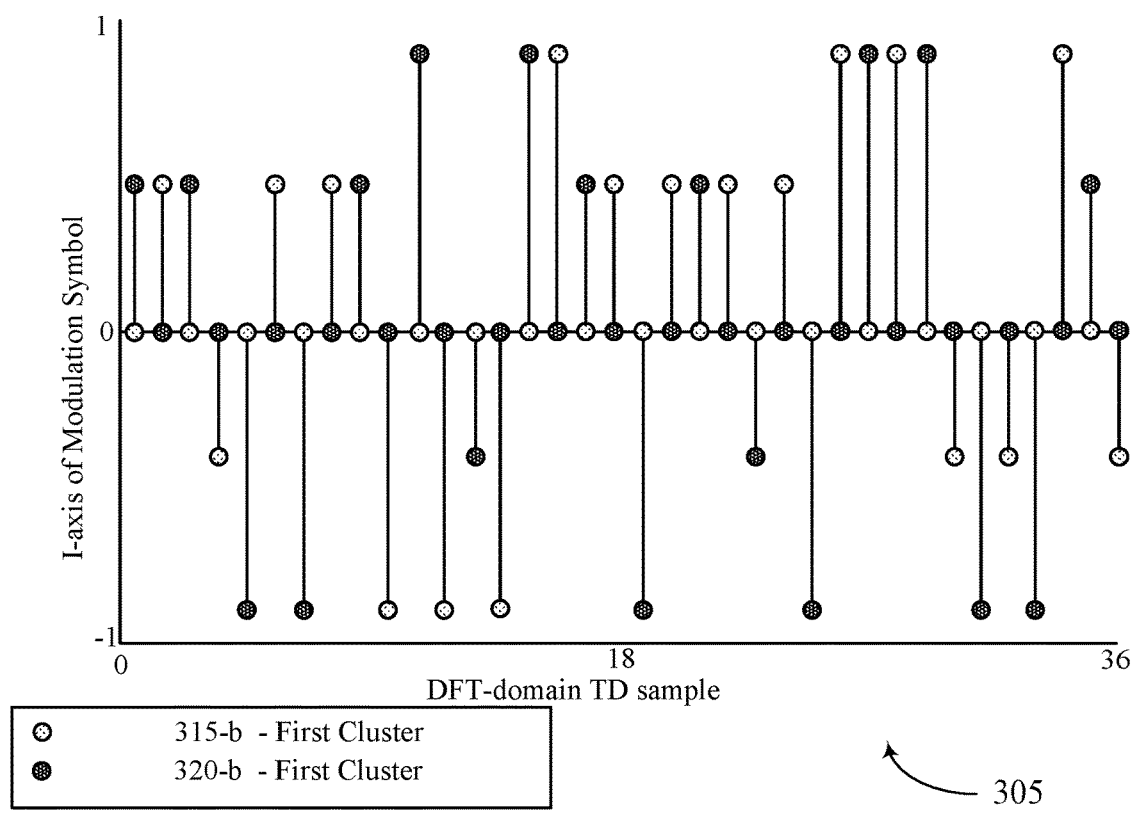

FIGS. 3*a* and 3*b* illustrate examples of a resource mapping 300 and a resource mapping 305, respectively, that support multi-cluster low PAPR waveform design in accordance with one or more aspects of the present disclosure. In some examples, the resource mapping 300 or the resource mapping 305 may implement or may be implemented by aspects of wireless communications systems 100 or 200.

The resource mapping 300 illustrates a block based multi frequency cluster time division multiplexing scheme. In the resource mapping 300, a total of 36 modulation symbols (e.g., M=36) are mapped to two 36-tone pre-DFT clusters (first cluster 315-*a* and second cluster 320-*a*). The two clusters are non-contiguous in the frequency domain.

In the first cluster 315-*a*, the first 18 (e.g., n=18) modulation symbols are mapped to the first 18 pre-DFT resource elements (1-18). Zero power symbols are placed into the second 18 (e.g., (M−n)) pre-DFT resource elements (19-36). In the second cluster 320-*a*, the 18 (e.g., (M−n)) modulation symbols are placed into the second 18 (e.g., (M−n)) pre-DFT resource elements (19-36). Zero power symbols are placed into the first 18 pre-DFT resource elements (1-18). A transmitting wireless device 205 may perform an M point DFT on the first cluster 315-*a* of pre-DFT resource elements to generate first frequency domain samples in the first frequency domain cluster. The transmitting wireless device 205 may perform an M point DFT on the second cluster 320-*a* of pre-DFT resource elements to generate second frequency domain samples in the second frequency domain cluster. The wireless device 205 may allocate the first frequency domain samples to the first frequency domain cluster and the second frequency domain samples to the second frequency domain cluster. The wireless device 205 may perform an N point IFFT on the first and second frequency domain samples to generate time domains samples (e.g., a time domain waveform). The wireless device 205 may append a cyclic prefix in front of the N time domain samples to manage inter symbol interference.

Although illustrated as having equal numbers (e.g., each 18), the number of modulation symbols n associated with the first frequency domain resource cluster and the number of modulation symbols (M−n) associated with the second frequency domain resource cluster may be of different sizes. For example, for the first cluster, n may correspond to a percent x of the total M modulation symbols. In the first cluster 315-*a* of pre-DFT resource elements, the n modulation symbols may be mapped to the first x % of the first cluster 315-*a* of pre-DFT resource elements, and the remaining (1-x) % of the first cluster 315-*a* of pre-DFT resource elements may be set to zeros. In the second cluster 320-*a* of pre-DFT resource elements, the (M−n) modulation symbols may be mapped to the second (1-x) % of the pre-DFT resource elements, and the first x % of pre-DFT resource elements may be set to zeros. In some cases, a block based multi-cluster time division multiplexing scheme may include more than two clusters.

Block based multi-cluster time division multiplexing waveforms may have correlated tones in the frequency domain. Multiple users may be multiplexed on the same frequency resource in different time domain blocks. For example, multiple users may be separated either via frequency domain filtering or time domain separation after some equalization. A guardband or a cyclic prefix (corresponding to two different users) may be added to avoid inter symbol interference between two users.

The resource mapping 305 illustrates a comb based multi frequency cluster time division multiplexing scheme. In the resource mapping 305, a total of 36 modulation symbols (e.g., M=36) are mapped to two 36-tone pre-DFT clusters (first cluster 315-*b* and second cluster 320-*b*). The two clusters are non-contiguous in the frequency domain.

In the first cluster 315-*b*, 18 (e.g., n=18) modulation symbols are mapped to the 18 even indexed pre-DFT resource elements (e.g., 2, 4, 6, 8, etc.). Zero power symbols are placed into the 18 (e.g., (M−n)) odd indexed pre-DFT resource elements (e.g., 1, 3, 5, 7, etc.). In the second cluster 320-*b*, the 18 (e.g., (M−n)) modulation symbols are placed into the 18 (e.g., (M−n)) odd indexed pre-DFT resource elements (e.g., 1, 3, 5, 7, etc.). Zero power symbols are placed into the even indexed pre-DFT resource elements (e.g., 2, 4, 6, 8, etc.). A transmitting wireless device 205 may perform an M point DFT on the first cluster 315-*b* of pre-DFT resource elements to generate first frequency domain samples in the first frequency domain cluster. The transmitting wireless device 205 may perform an M point DFT on the second cluster 320-*b* of pre-DFT resource elements to generate second frequency domain samples in the second frequency domain cluster. The wireless device 205 may allocate the first frequency domain samples to the first frequency domain cluster and the second frequency domain samples to the second frequency domain cluster. The wireless device 205 may perform an N point IFFT on the first and second frequency domain samples to generate time domain samples (e.g., a time domain waveform). The wireless device 205 may append a cyclic prefix in front of the N time domain samples to manage inter symbol interference.

Although illustrated as having equal numbers (e.g., each 18), the number of modulation symbols n associated with the first frequency domain resource cluster and the number of modulation symbols (M−n) associated with the second frequency domain resource cluster may be of different sizes. Although shown as mapped to even and odd indexed pre-DFT resource elements, any interleaving scheme may be applied. For example, the ratio of modulation symbols in each cluster (e.g., first cluster 315-*b* and second cluster 320-*b*) may be different. For example, in the first cluster 315-*b*, modulation symbols may be mapped to the x % out of every C pre-DFT resource elements, and the remaining (1-x) % of the pre-DFT resource elements may be set to zeros. In the second cluster, the modulation symbols may be mapped to the (1-x) % out of every pre-DFT resource elements (e.g., where the corresponding pre-DFT symbols are set to zeros), and the remaining x % of the pre-DFT resource elements may be set to zeros. In some cases, a comb based time division multiplexing scheme may include more than two clusters. Each cluster may occupy 1 or multiple out of the C combs. In some cases, each cluster may occupy an unequal number of combs.

Multi frequency cluster single DFT waveforms may have higher PAPR than single frequency cluster single DFT waveforms. Application of a block or comb based scheme and two DFTs for multi frequency clusters, as described herein, may improve PAPR as compared to multi frequency cluster single DFT waveforms. In some cases, block based multi frequency cluster multi DFT waveforms may have a lower PAPR as compared to comb based multi frequency cluster multi DFT waveforms.

Comb based multi frequency cluster time division multiplexing waveforms may have repetition or a Walsh pattern in frequency. Multiple users within the combs may be multiplexed on the same frequency resource but occupying different combs and multi-user detection may be performed based on exploiting the repetition or Walsh pattern.

Figure 4:
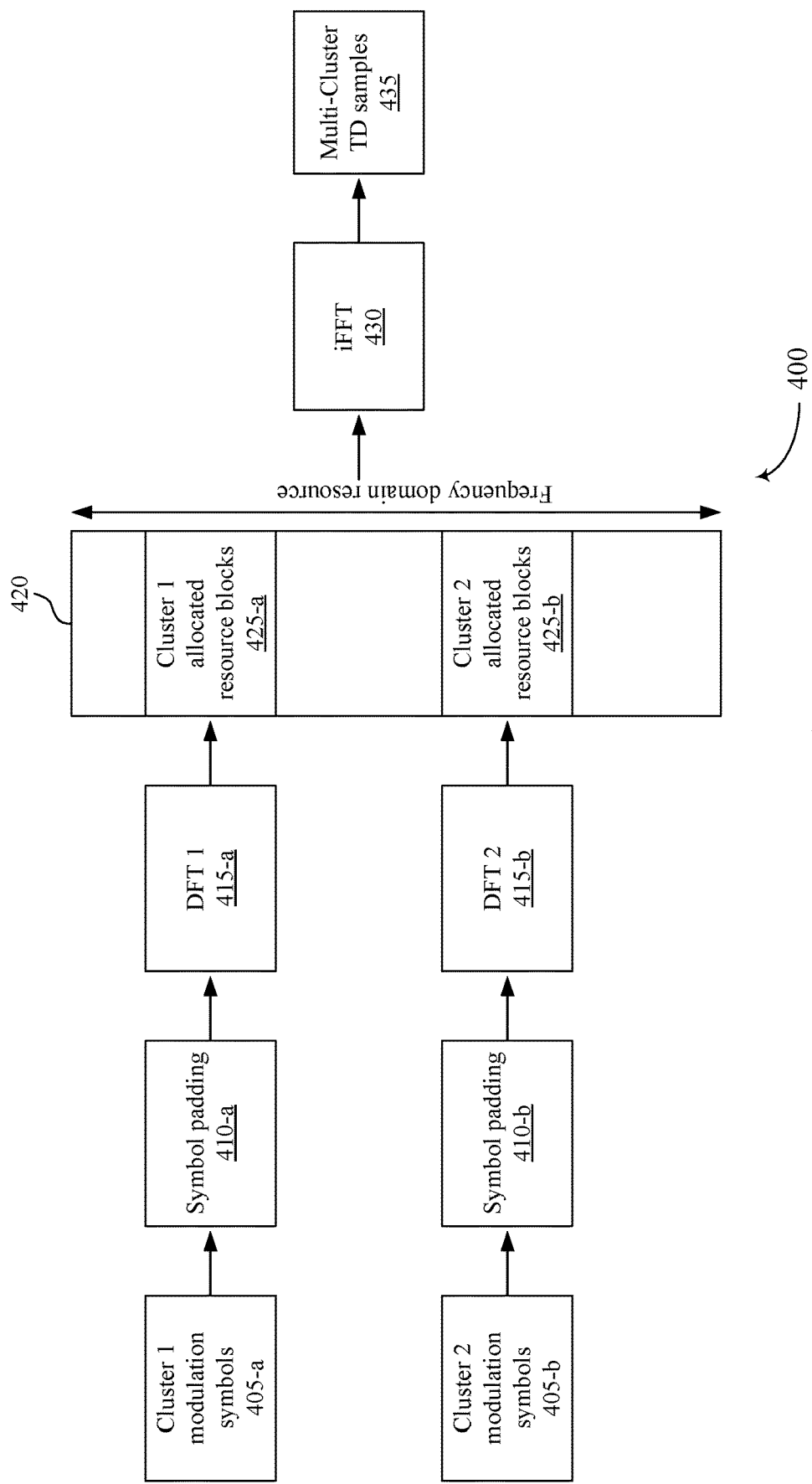
FIG. 4 illustrates an example of a coding scheme that supports multi-cluster low peak to average power ratio waveform design in accordance with one or more aspects of the present disclosure.

FIG. 4 illustrates an example of a coding scheme 400 that supports multi-cluster low PAPR waveform design in accordance with one or more aspects of the present disclosure. In some examples, the coding scheme 400 may implement aspects of the wireless communications systems 100 or 200 or may be implemented by aspects of the wireless communications systems 100 or 200.

A wireless device may obtain a set of M modulation symbols associated with a codeword, the set of M modulation symbols including a first subset of n modulation symbols 405-*a* and a second subset of (M−n) modulation symbols 405-*b*. The wireless device 205 may be allocated frequency resources in the frequency domain resources 420, the allocated frequency resources including the first set of frequency resources 425-*a* and the second set of frequency resources 425-*b*. The first set of frequency resources 425-*a* and the second set of frequency resources 425-*b* may be non-contiguous (have unallocated frequency resources between the sets).

At 410-*a* the wireless device 205 may pad the pre-DFT resource elements of the first subset of modulation symbols 405-*a* with a first set of substitute symbols and at 410-*b* the wireless device 205 may pad the pre-DFT resource elements of the second subset of modulation symbols 405-*b* with a second set of substitute symbols, for example according to one of either a block based scheme or a comb based scheme. The padding may be zero-power symbols when the wireless device 205 is a UE 115 or a network entity 105. If the wireless device 205 is a network entity 105, the padding may be symbols for a different recipient UE 115.

The wireless device 205 may perform a first DFT 415-*a* on the second set of M modulation symbols to generate a first set of frequency domain samples associated with the first set of frequency resources 425-*a* allocated to the wireless device 205. The second set of modulation symbols includes the first subset of n modulation symbols 405-*a* and the first set of (M−n) substitute modulation symbols. The wireless device 205 may perform a second DFT 415-*b* on a third set of M modulation symbols to generate a second set of frequency domain samples associated with the second set of frequency resources 425-*b* allocated to the wireless device 205 and separated in frequency from the first set of frequency resources. The third set of modulation symbols includes the second subset of (M−n) modulation symbols 405-*b* and the second set of n substitute modulation symbols.

The wireless device 205 may then perform an IFFT 430 on the first and second frequency domain samples to generate time domain samples 435 (e.g., a time domain waveform). The wireless device 205 may transmit the time domain waveform. Another wireless device 205 may receive the transmitted time domain waveform, and perform inverse processes (e.g., an FFT followed by two inverse DFTs) to extract the first and second subsets of modulation symbols from the time domain waveform 235, and accordingly extract the modulation symbols associated with the codeword.

Figure 5:
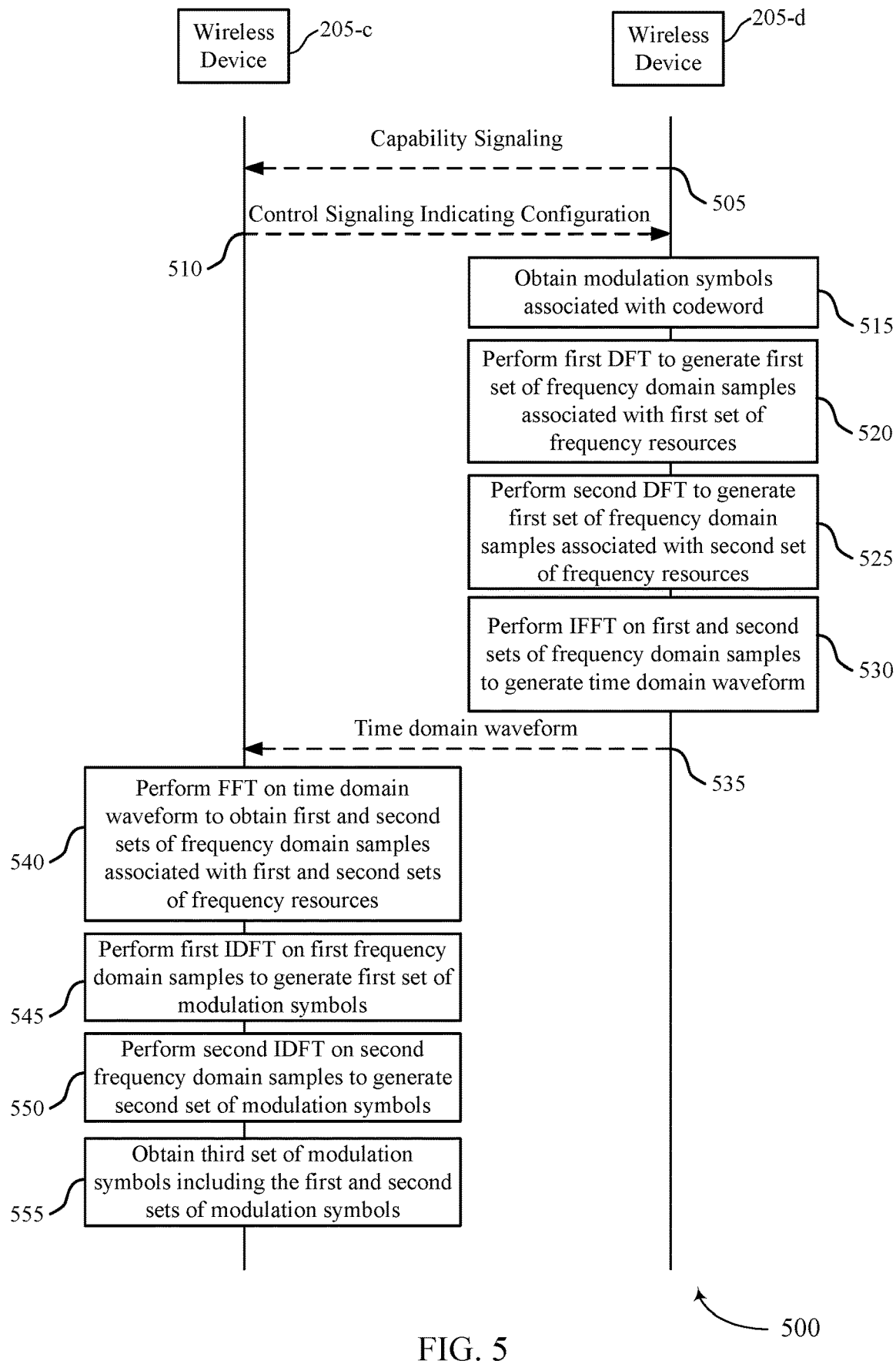
FIG. 5 illustrates an example of a process flow that supports multi-cluster low peak to average power ratio waveform design in accordance with one or more aspects of the present disclosure.

FIG. 5 illustrates an example of a process flow 500 that supports multi-cluster low PAPR waveform design in accordance with one or more aspects of the present disclosure. The process flow 500 may include a wireless device 205-*c* (which may also be referred to as a receiving wireless device or receiver) and a wireless device 205-*d* (which may also be referred to as a transmitting wireless device or transmitter), which may be examples of a wireless device 205 as described herein. In the following description of the process flow 500, the operations between the wireless device 205-*c* and the wireless device 205-*d* may be transmitted in a different order than the example order shown, or the operations performed by wireless device 205-*c* and the wireless device 205-*d* may be performed in different orders or at different times. Some operations may also be omitted from the process flow 500, and other operations may be added to the process flow 500.

In some examples, at 505, the wireless device 205-*d*, which may be a UE 115 (e.g., in the example of uplink transmissions to a network entity, such as a base station), may transmit, to the wireless device 205-*c*, which may be a network entity 105 (e.g., for uplink), UE capability signaling indicating a capability of the wireless device 205-*d* to perform a first inverse DFT and a second inverse DFT for frequency resources separated in frequency. In such examples, at 510, the wireless device 205-*c* may transmit, to the wireless device 205-*d* in response to the UE capability signaling at 505, control signaling indicating a configuration for performing a first inverse DFT and a second inverse DFT for frequency resources allocated to the wireless device 205-*d*.

In some examples, wireless device 205-*c* and wireless device 205-*d* may be examples of UEs 115 in communication via sidelink. In such examples, one or both of wireless device 205-*c* or wireless device 205 may transmit capability signaling to the other of wireless device 205-*c* or wireless device 205 indicating a capability to receive and/or transmit using multiple DFTs and/or receive using multiple inverse DFTs for frequency resources separated in frequency. Additionally, one or both of wireless device 205-*c* or wireless device 205 may transmit configuration signaling to the other of wireless device 205-*c* or wireless device 205 for receiving and/or transmitting using multiple DFTs and/or receive using multiple inverse DFTs for frequency resources separated in frequency.

In some examples, at 505, the wireless device 205-*d*, which may be a network entity 105 (e.g., in the example of downlink transmissions to a UE), may transmit, to the wireless device 205-*c*, which may be a UE 115 (e.g., for downlink), the UE capability signaling. The UE capability signaling may indicate a capability of the wireless device 205-*c* to perform a first DFT and a second DFT for frequency resources separated in frequency may be transmitted from wireless device 205-*c* to wireless device 205-*d*. Additionally, in such examples, at 510, the wireless device 205-*d* may transmit, to the wireless device 205-*c* in response to the UE capability signaling at 505, control signaling indicating a configuration for performing a first DFT and a second DFT for frequency resources allocated to the wireless device 205-*c*.

At 515, the wireless device 205-*d* may obtain a set of modulation symbols associated with a codeword, the set of modulation symbols including a first subset of modulation symbols and a second subset of modulation symbols.

At 520, the wireless device 205-*d* may perform a first DFT on a second set of modulation symbols to generate a first set of frequency domain samples associated with a first set of frequency resources allocated to the wireless device 205-*d*, the second set of modulation symbols including the first subset of modulation symbols and a first set of substitute modulation symbols replacing the second subset of modulation symbols.

At 525, the wireless device 205-*d* may perform a second DFT on a third set of modulation symbols to generate a second set of frequency domain samples associated with a second set of frequency resources allocated to the wireless device 205-*d* and separated in frequency from the first set of frequency resources, the third set of modulation symbols including the second subset of modulation symbols and a second set of substitute modulation symbols replacing the first subset of modulation symbols.

In some examples, the wireless device 205-*d* may map, for the first DFT, the first subset of modulation symbols to a first block of resource elements and the first set of substitute modulation symbols to a second block of resource elements, and map, for the second DFT, the second set of substitute modulation symbols to the first block and the second subset of modulation symbols to the second block.

In some examples, the wireless device 205-*d* may map, for the first DFT, the first subset of modulation symbols to odd-indexed resource elements and the first set of substitute modulation symbols to even-indexed resource elements, and map for the second DFT, the second set of substitute modulation symbols to the odd-indexed resource elements and the second subset of modulation symbols to the even-indexed resource elements.

In some examples, the wireless device 205-*d* may map, for the first DFT, the first subset of modulation symbols to a first set of resource elements that are interleaved with a second set of resource elements for the first set of substitute modulation symbols, and map for the second DFT, the second set of substitute modulation symbols to the first set of resource elements and the second subset of modulation symbols to the second set of resource elements.

In some cases, the first set of substitute modulation symbols and the second set of substitute modulation symbols may be zero power modulation symbols. In some cases, the first subset of modulation symbols may include a different number of modulation symbols than the second subset of modulation symbols.

In some cases, the wireless device 205-d may perform the first DFT associated with a number of points and may perform the second DFT associated with the number of points, the number of points equal to a number of modulation symbols of the set of modulation symbols.

At 530, the wireless device 205-d may perform an IFFT on the first set of frequency domain samples and the second set of frequency domain samples to generate a time domain waveform.

At 535, the wireless device 205-d may transmit, to the wireless device 205-c, the time domain waveform on the first set of frequency resources and the second set of frequency resources. In some cases, the time domain waveform is transmitted to a second wireless device, the first set of substitute modulation symbols are associated with a transmission to a third wireless device, and the second set of substitute modulation symbols are associated with the transmission to the third wireless device. In some cases, the time domain waveform may be a DFT-s-OFDM waveform.

At 540, the wireless device 205-c may perform, on the time domain waveform, an FFT to obtain a first set of frequency domain samples associated with the first set of frequency resources and a second set of frequency domain samples associated with the second set of frequency resources.

At 545, the wireless device 205-c may perform a first inverse DFT on the first set of frequency domain samples to generate a first set of modulation symbols.

At 550, the wireless device 205-c may perform a second inverse DFT on the second set of frequency domain samples to generate a second set of modulation symbols.

In some cases, both the first inverse DFT and the second inverse DFT are associated with a number of points, and the number of points is equal to a number of modulation symbols of the third set of modulation symbols.

At 555, the wireless device 205-c may obtain a third set of modulation symbols associated with a codeword, the third set of modulation symbols including a first subset of modulation symbols extracted from the first set of modulation symbols and a second subset of modulation symbols extracted from the second set of modulation symbols.

In some cases, the wireless device 205-c may extract, from the first set of modulation symbols, the first subset of modulation symbols from a first block of resource elements, and extract, from the second set of modulation symbols, the second subset of modulation symbols a second block of resource elements, In some cases, the wireless device 205-c may extract, from the first set of modulation symbols, the first subset of modulation symbols from odd-indexed resource elements, and extract, from the second set of modulation symbols, the second subset of modulation symbols from even-indexed resource elements.

In some cases, the wireless device 205-c may extract, from the first set of modulation symbols, the first subset of modulation symbols from a first set of resource elements that are interleaved with a second set of resource elements and extract, from the second set of modulation symbols, the second subset of modulation symbols from the second set of resource elements that are interleaved with the first set of resource elements.

In some cases, the first set of modulation symbols includes a first set of substitute modulation symbols that include zero power modulation symbols and the second set of modulation symbols includes a second set of substitute modulation symbols that include zero power modulation symbols.

In some cases, the first set of modulation symbols include a first set of substitute modulation symbols associated with a different receiving wireless device that the wireless device 205-c and the second set of modulation symbols further include a second set of substitute modulation symbols associated with the different receiving wireless device.

In some cases, the first subset of modulation symbols includes a different number of modulation symbols than the second subset of modulation symbols.

Figure 6:
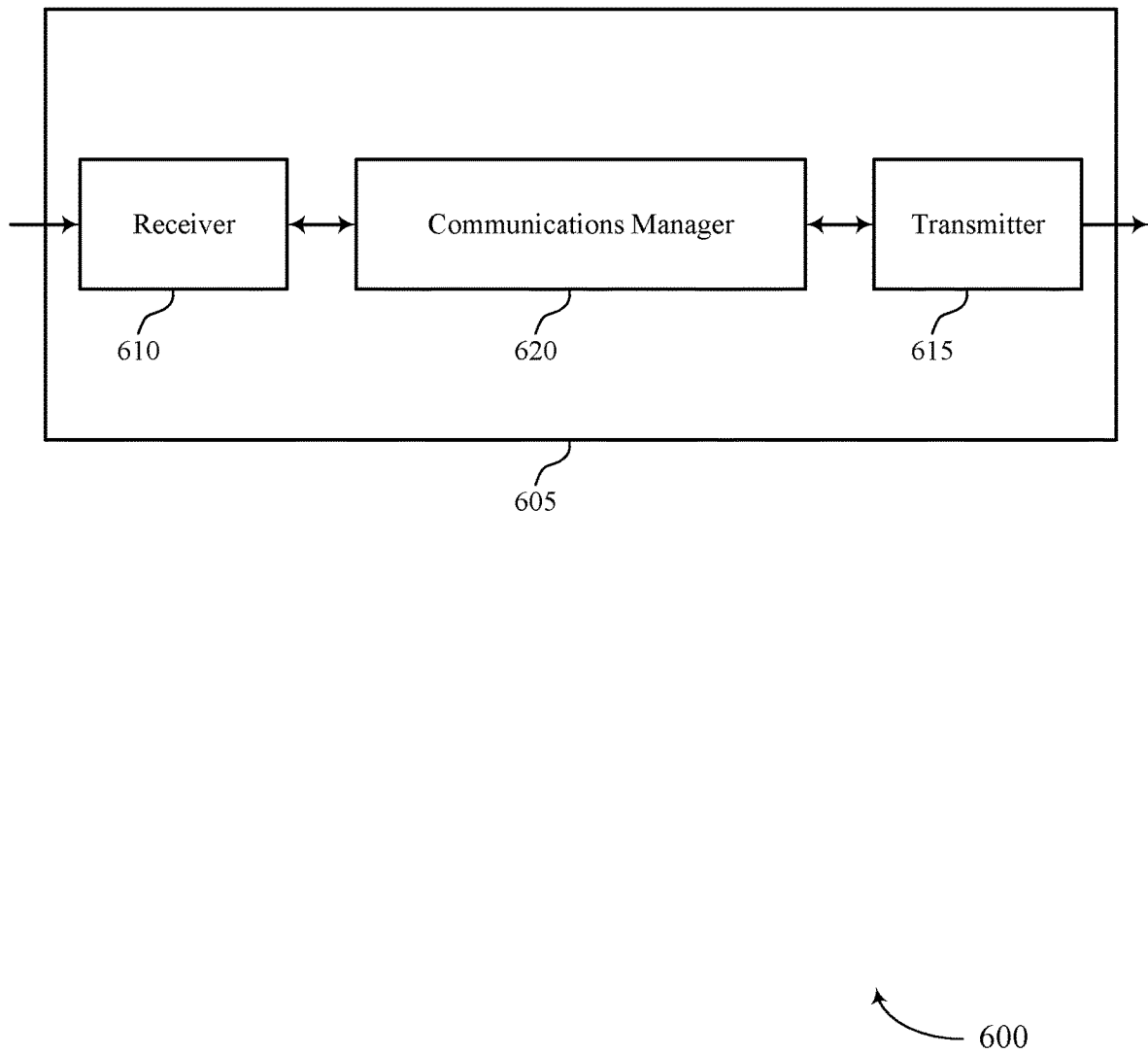
FIGS. 6 and 7 show block diagrams of devices that support multi-cluster low peak to average power ratio waveform design in accordance with one or more aspects of the present disclosure.

FIG. 6 shows a block diagram 600 of a device 605 that supports multi-cluster low PAPR waveform design in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-cluster low PAPR waveform design). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-cluster low PAPR waveform design). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of multi-cluster low PAPR waveform design as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a wireless device in accordance with examples as disclosed herein. For example, the communications manager 620 may be configured as or otherwise support a means for obtaining a set of modulation symbols associated with a codeword, the set of modulation symbols including a first subset of modulation symbols and a second subset of modulation symbols. The communications manager 620 may be configured as or otherwise support a means for performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The communications manager 620 may be configured as or otherwise support a means for performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The communications manager 620 may be configured as or otherwise support a means for performing an IFFT on the first set of frequency domain samples and the second set of frequency domain samples to generate a time domain waveform. The communications manager 620 may be configured as or otherwise support a means for transmitting the time domain waveform on the first set of frequency resources and the second set of frequency resources.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources by enabling transmission of low PAPR waveforms using non-contiguous frequency domain resources.

Figure 7:
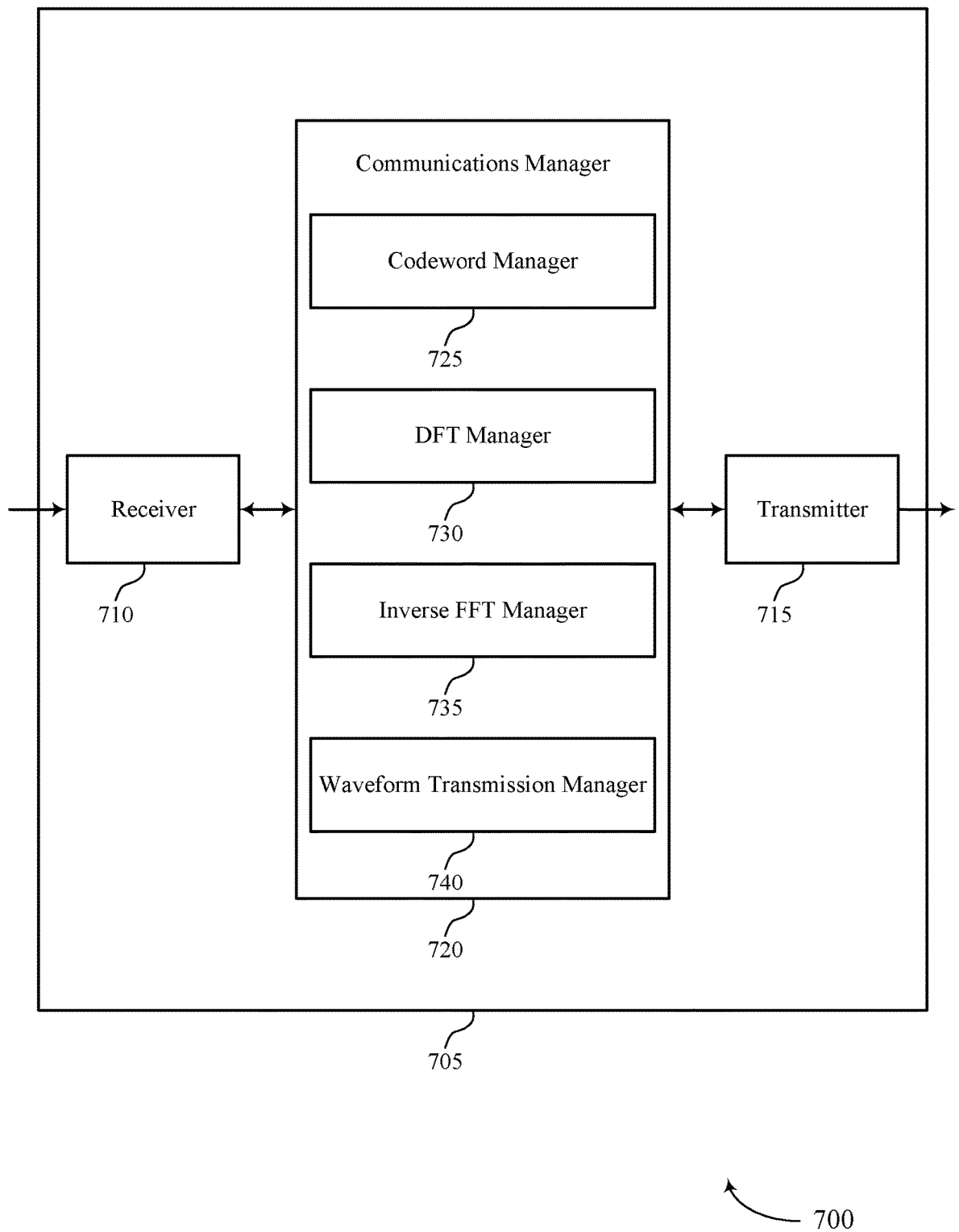

FIG. 7 shows a block diagram 700 of a device 705 that supports multi-cluster low PAPR waveform design in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-cluster low PAPR waveform design). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-cluster low PAPR waveform design). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of multi-cluster low PAPR waveform design as described herein. For example, the communications manager 720 may include a codeword manager 725, a DFT manager 730, an inverse FFT manager 735, a waveform transmission manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a wireless device in accordance with examples as disclosed herein. The codeword manager 725 may be configured as or otherwise support a means for obtaining a set of modulation symbols associated with a codeword, the set of modulation symbols including a first subset of modulation symbols and a second subset of modulation symbols. The DFT manager 730 may be configured as or otherwise support a means for performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The DFT manager 730 may be configured as or otherwise support a means for performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The inverse FFT manager 735 may be configured as or otherwise support a means for performing an IFFT on the first set of frequency domain samples and the second set of frequency domain samples to generate a time domain waveform. The waveform transmission manager 740 may be configured as or otherwise support a means for transmitting the time domain waveform on the first set of frequency resources and the second set of frequency resources.

Figure 8:
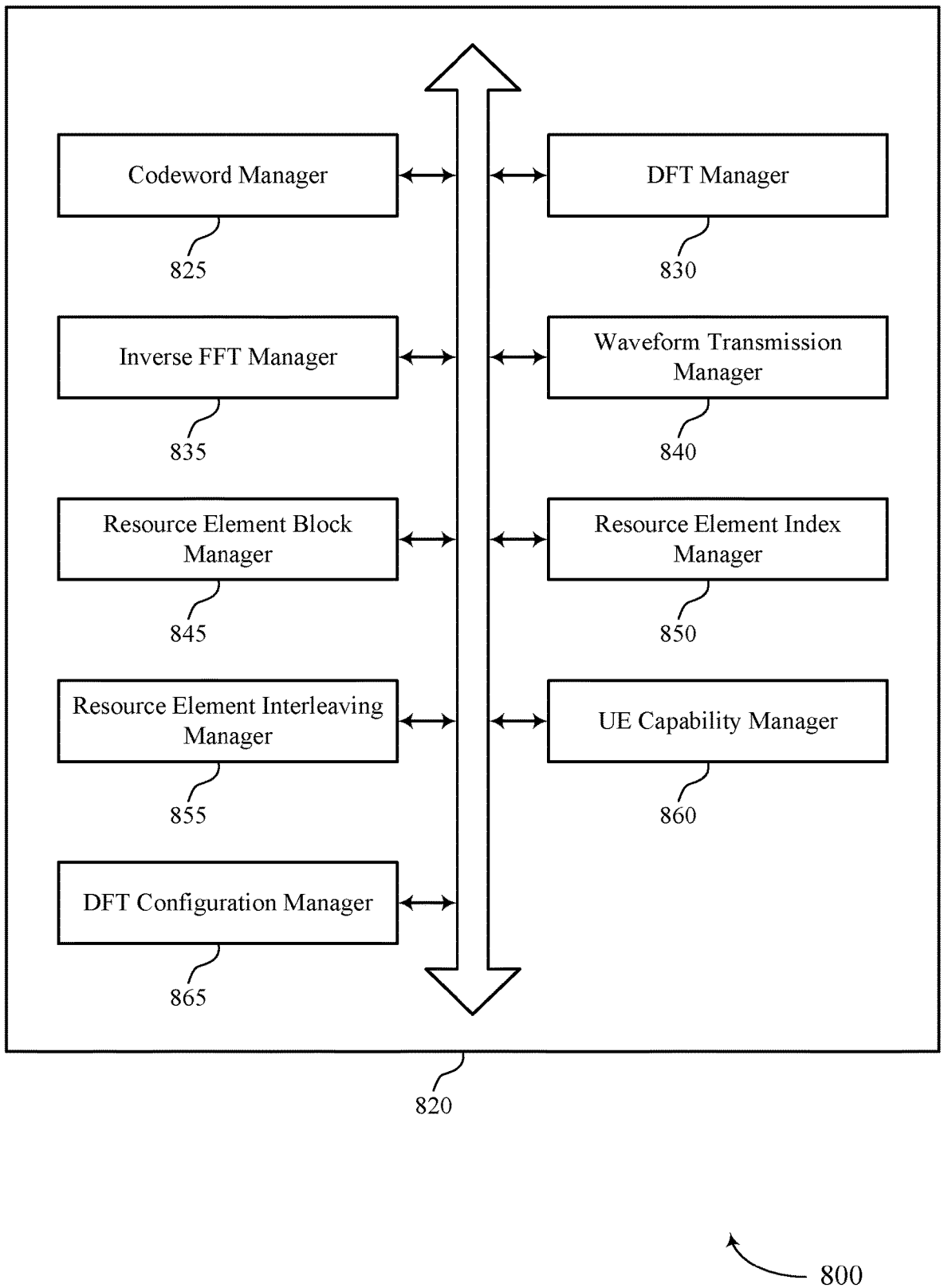
FIG. 8 shows a block diagram of a communications manager that supports multi-cluster low peak to average power ratio waveform design in accordance with one or more aspects of the present disclosure.

FIG. 8 shows a block diagram 800 of a communications manager 820 that supports multi-cluster low PAPR waveform design in accordance with one or more aspects of the present disclosure. The communications manager 820 may be an example of aspects of a communications manager 620, a communications manager 720, or both, as described herein. The communications manager 820, or various components thereof, may be an example of means for performing various aspects of multi-cluster low PAPR waveform design as described herein. For example, the communications manager 820 may include a codeword manager 825, a DFT manager 830, an inverse FFT manager 835, a waveform transmission manager 840, a resource element block manager 845, a resource element index manager 850, a resource element interleaving manager 855, a UE capability manager 860, a DFT configuration manager 865, or any combination thereof. Each of these components may communicate, directly or indirectly, with one another (e.g., via one or more buses).

The communications manager 820 may support wireless communications at a wireless device in accordance with examples as disclosed herein. The codeword manager 825 may be configured as or otherwise support a means for obtaining a set of modulation symbols associated with a codeword, the set of modulation symbols including a first subset of modulation symbols and a second subset of modulation symbols. The DFT manager 830 may be configured as or otherwise support a means for performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. In some examples, the DFT manager 830 may be configured as or otherwise support a means for performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The inverse FFT manager 835 may be configured as or otherwise support a means for performing an IFFT on the first set of frequency domain samples and the second set of frequency domain samples to generate a time domain waveform. The waveform transmission manager 840 may be configured as or otherwise support a means for transmitting the time domain waveform on the first set of frequency resources and the second set of frequency resources.

In some examples, the resource element block manager 845 may be configured as or otherwise support a means for mapping, for the first DFT, the first subset of modulation symbols to a first block of resource elements and the first set of substitute modulation symbols to a second block of resource elements. In some examples, the resource element block manager 845 may be configured as or otherwise support a means for mapping, for the second DFT, the second set of substitute modulation symbols to the first block and the second subset of modulation symbols to the second block.

In some examples, the resource element index manager 850 may be configured as or otherwise support a means for mapping, for the first DFT, the first subset of modulation symbols to odd-indexed resource elements and the first set of substitute modulation symbols to even-indexed resource elements. In some examples, the resource element index manager 850 may be configured as or otherwise support a means for mapping, for the second DFT, the second set of substitute modulation symbols to the odd-indexed resource elements and the second subset of modulation symbols to the even-indexed resource elements.

In some examples, the resource element interleaving manager 855 may be configured as or otherwise support a means for mapping, for the first DFT, the first subset of modulation symbols to a first set of resource elements that are interleaved with a second set of resource elements for the first set of substitute modulation symbols. In some examples, the resource element interleaving manager 855 may be configured as or otherwise support a means for mapping, for the second DFT, the second set of substitute modulation symbols to the first set of resource elements and the second subset of modulation symbols to the second set of resource elements.

In some examples, the first set of substitute modulation symbols and the second set of substitute modulation symbols include zero power modulation symbols.

In some examples, the time domain waveform is transmitted to a second wireless device, the first set of substitute modulation symbols are associated with a transmission to a third wireless device, and the second set of substitute modulation symbols are associated with the transmission to the third wireless device.

In some examples, the first subset of modulation symbols includes a different number of modulation symbols than the second subset of modulation symbols.

In some examples, to support performing the first DFT and performing the second DFT, the DFT manager 830 may be configured as or otherwise support a means for performing the first DFT associated with a number of points and the second DFT associated with the number of points, the number of points equal to a number of modulation symbols of the set of modulation symbols.

In some examples, the wireless device is a UE, and the UE capability manager 860 may be configured as or otherwise support a means for transmitting UE capability signaling indicating a capability of the UE to perform the first DFT and the second DFT for frequency resources separated in frequency. In some examples, the wireless device is a UE, and the DFT configuration manager 865 may be configured as or otherwise support a means for receiving, at least in part in response to the UE capability signaling, control signaling indicating a configuration for performing the first DFT and the second DFT for the frequency resources.

In some examples, the UE capability manager 860 may be configured as or otherwise support a means for receiving, from a UE, UE capability signaling indicating a capability of the UE to perform a first inverse DFT and a second inverse DFT for frequency resources separated in frequency. In some examples, the DFT configuration manager 865 may be configured as or otherwise support a means for transmitting, at least in part in response to the UE capability signaling, control signaling indicating a configuration for performing the first inverse DFT and the second inverse DFT for the frequency resources.

In some examples, the time domain waveform includes a DFT spread frequency division multiplexing waveform.

Figure 9:
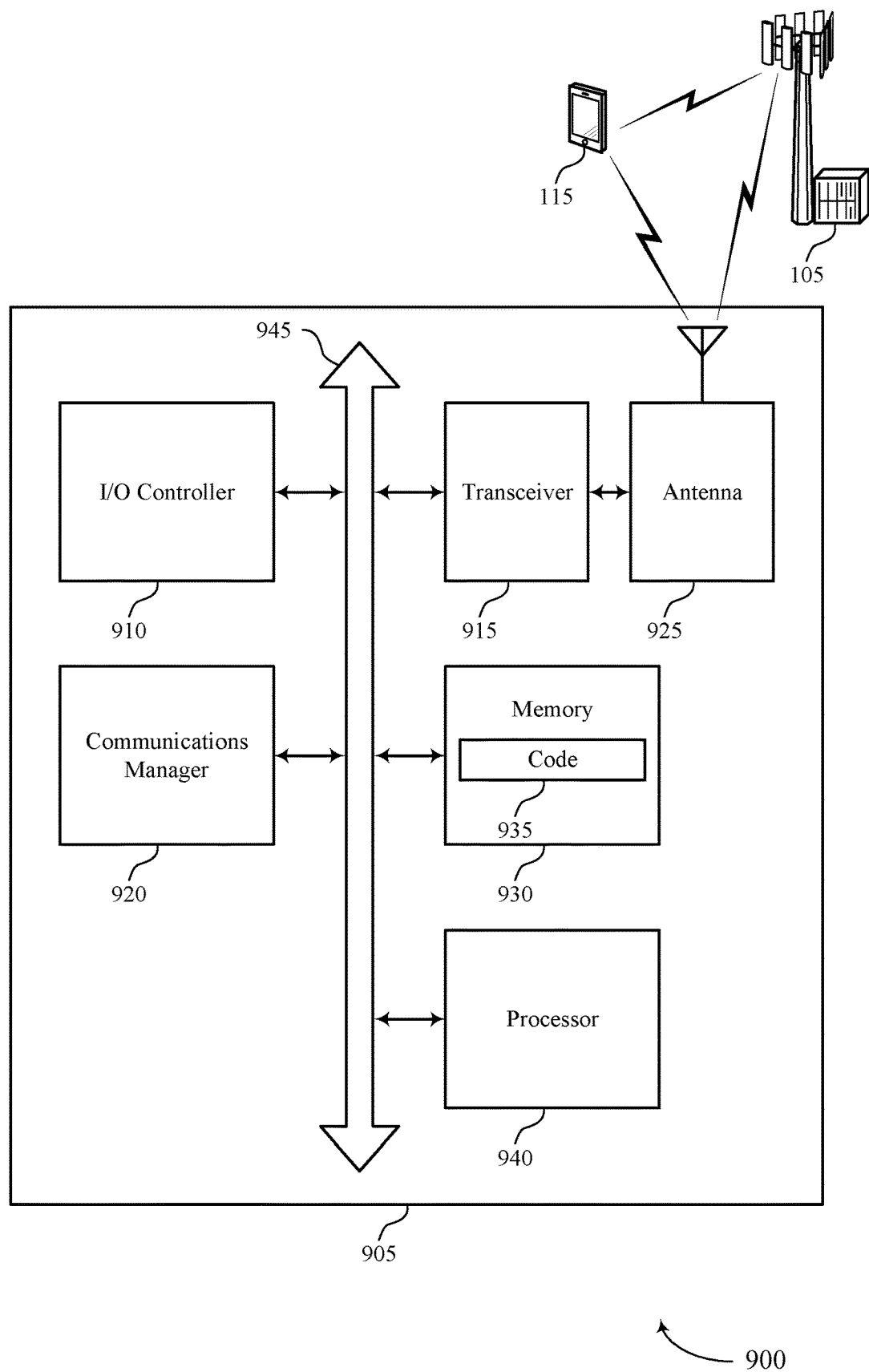
FIG. 9 shows a diagram of a system including a device that supports multi-cluster low peak to average power ratio waveform design in accordance with one or more aspects of the present disclosure.

FIG. 9 shows a diagram of a system 900 including a device 905 that supports multi-cluster low PAPR waveform design in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting multi-cluster low PAPR waveform design). For example, the device 905 or a component of the device 905 may include a processor 940 and memory 930 coupled with or to the processor 940, the processor 940 and memory 930 configured to perform various functions described herein.

The communications manager 920 may support wireless communications at a wireless device in accordance with examples as disclosed herein. For example, the communications manager 920 may be configured as or otherwise support a means for obtaining a set of modulation symbols associated with a codeword, the set of modulation symbols including a first subset of modulation symbols and a second subset of modulation symbols. The communications manager 920 may be configured as or otherwise support a means for performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The communications manager 920 may be configured as or otherwise support a means for performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The communications manager 920 may be configured as or otherwise support a means for performing an IFFT on the first set of frequency domain samples and the second set of frequency domain samples to generate a time domain waveform. The communications manager 920 may be configured as or otherwise support a means for transmitting the time domain waveform on the first set of frequency resources and the second set of frequency resources.

By including or configuring the communications manager 920 in accordance with examples as described herein, the device 905 may support techniques for improved communication reliability, more efficient utilization of communication resources, improved coordination between devices, and improved utilization of processing capability by enabling transmission of low PAPR waveforms using non-contiguous frequency domain resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of multi-cluster low PAPR waveform design as described herein, or the processor 940 and the memory 930 may be otherwise configured to perform or support such operations.

Figure 10:
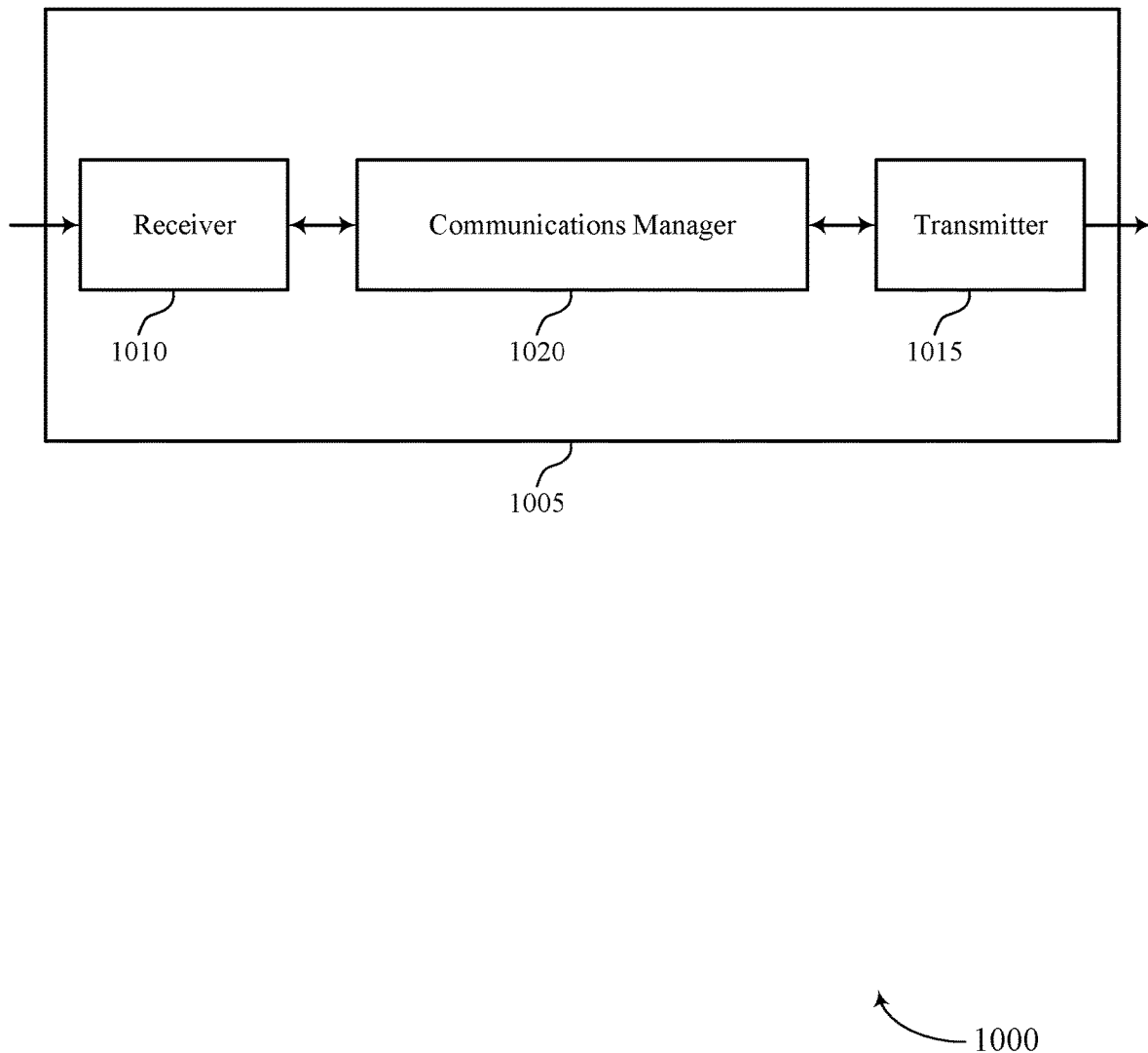
FIGS. 10 and 11 show block diagrams of devices that support multi-cluster low peak to average power ratio waveform design in accordance with one or more aspects of the present disclosure.

FIG. 10 shows a block diagram 1000 of a device 1005 that supports multi-cluster low PAPR waveform design in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of multi-cluster low PAPR waveform design as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a wireless device in accordance with examples as disclosed herein. For example, the communications manager 1020 may be configured as or otherwise support a means for receiving a time domain waveform on a first set of frequency resources and a second set of frequency resources, the second set of frequency resources separated in frequency from the first set of frequency resources. The communications manager 1020 may be configured as or otherwise support a means for performing, on the time domain waveform, an FFT to obtain a first set of frequency domain samples associated with the first set of frequency resources and a second set of frequency domain samples associated with the second set of frequency resources. The communications manager 1020 may be configured as or otherwise support a means for performing a first inverse DFT on the first set of frequency domain samples to generate a first set of modulation symbols. The communications manager 1020 may be configured as or otherwise support a means for performing a second inverse DFT on the second set of frequency domain samples to generate a second set of modulation symbols. The communications manager 1020 may be configured as or otherwise support a means for obtaining a third set of modulation symbols associated with a codeword, the third set of modulation symbols including a first subset of modulation symbols extracted from the first set of modulation symbols and a second subset of modulation symbols extracted from the second set of modulation symbols.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources by enabling transmission of low PAPR waveforms using non-contiguous frequency domain resources.

Figure 11:
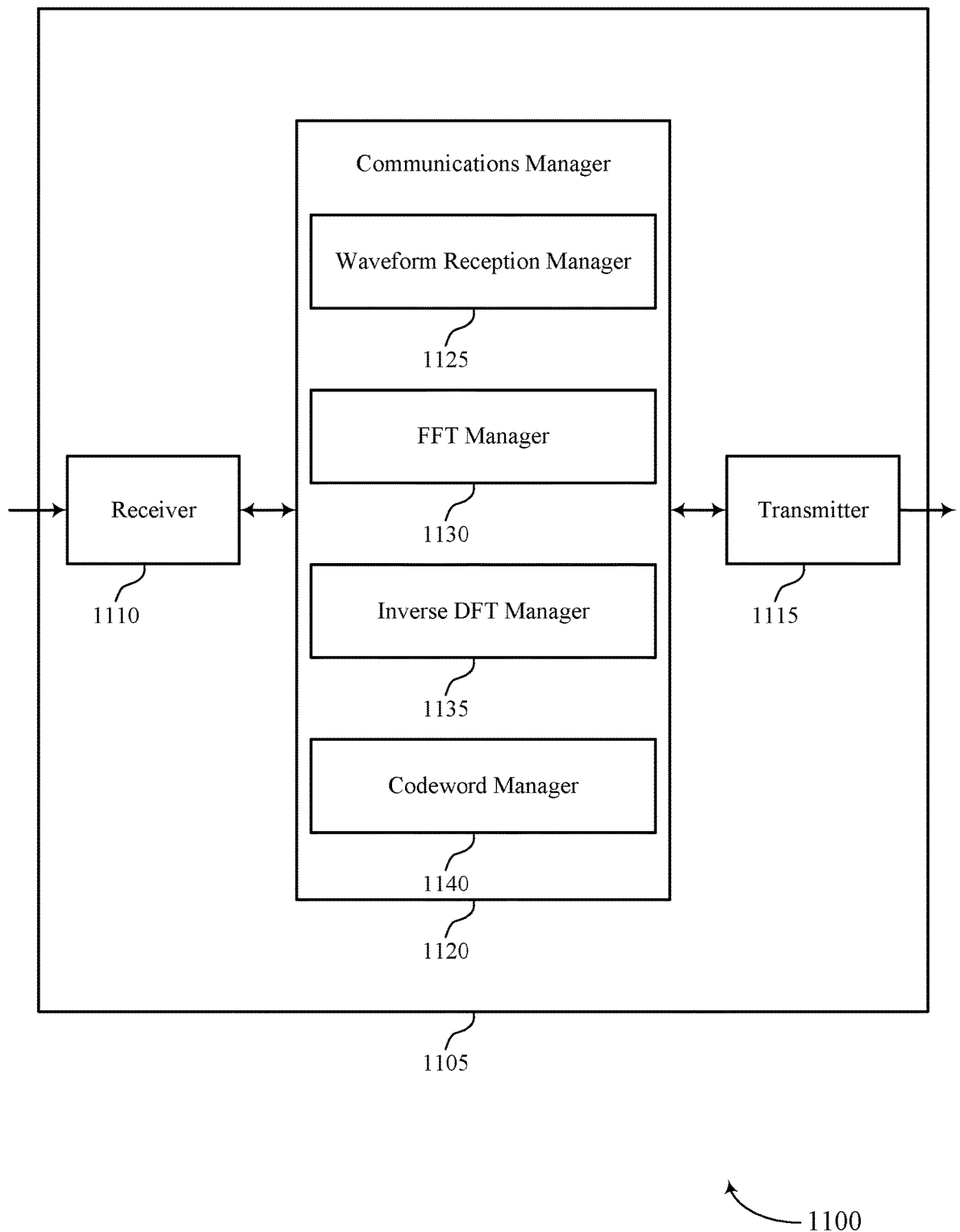

FIG. 11 shows a block diagram 1100 of a device 1105 that supports multi-cluster low PAPR waveform design in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of multi-cluster low PAPR waveform design as described herein. For example, the communications manager 1120 may include a waveform reception manager 1125, an FFT manager 1130, an inverse DFT manager 1135, a codeword manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a wireless device in accordance with examples as disclosed herein. The waveform reception manager 1125 may be configured as or otherwise support a means for receiving a time domain waveform on a first set of frequency resources and a second set of frequency resources, the second set of frequency resources separated in frequency from the first set of frequency resources. The FFT manager 1130 may be configured as or otherwise support a means for performing, on the time domain waveform, an FFT to obtain a first set of frequency domain samples associated with the first set of frequency resources and a second set of frequency domain samples associated with the second set of frequency resources. The inverse DFT manager 1135 may be configured as or otherwise support a means for performing a first inverse DFT on the first set of frequency domain samples to generate a first set of modulation symbols. The inverse DFT manager 1135 may be configured as or otherwise support a means for performing a second inverse DFT on the second set of frequency domain samples to generate a second set of modulation symbols. The codeword manager 1140 may be configured as or otherwise support a means for obtaining a third set of modulation symbols associated with a codeword, the third set of modulation symbols including a first subset of modulation symbols extracted from the first set of modulation symbols and a second subset of modulation symbols extracted from the second set of modulation symbols.

Figure 12:
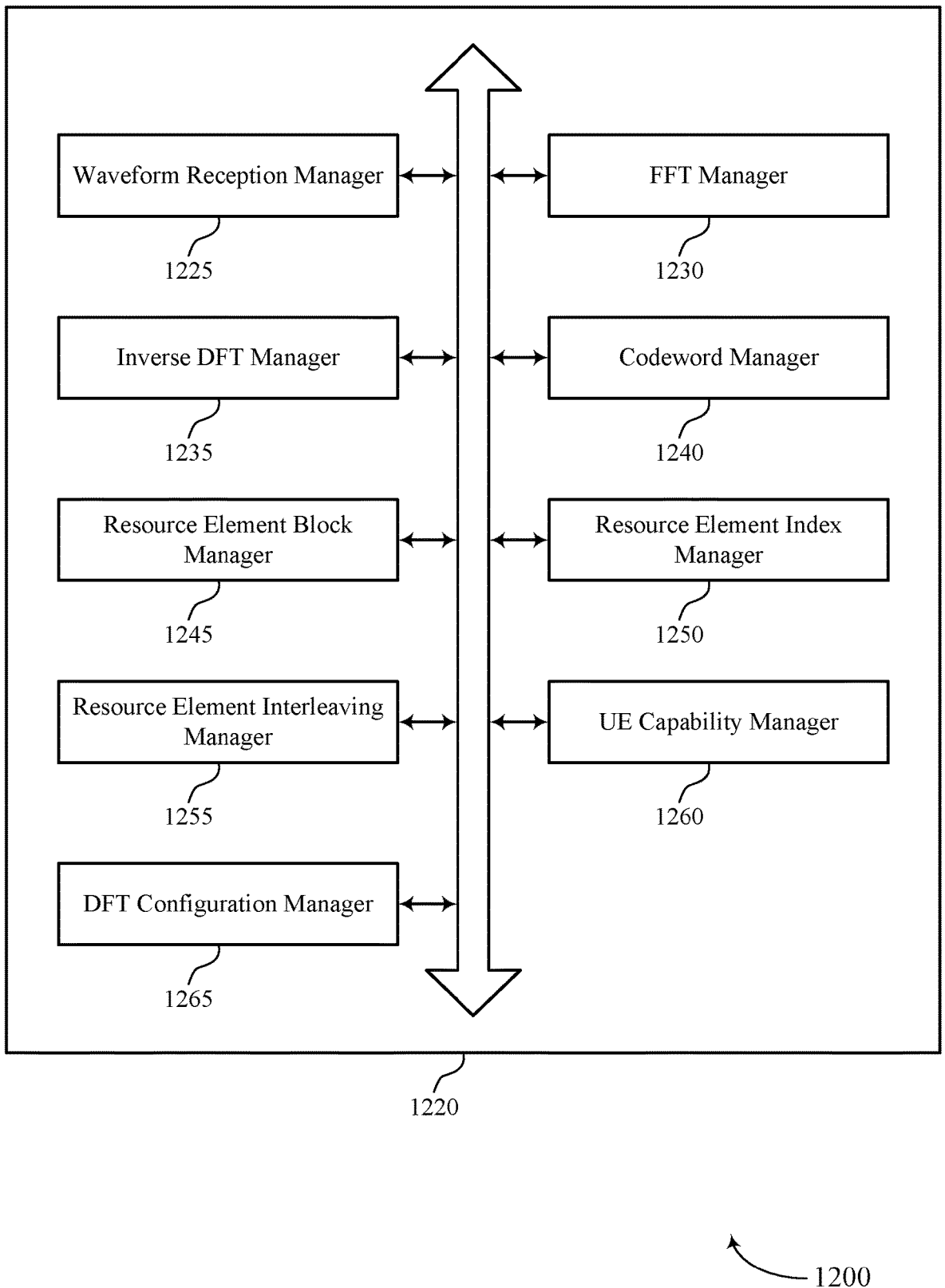
FIG. 12 shows a block diagram of a communications manager that supports multi-cluster low peak to average power ratio waveform design in accordance with one or more aspects of the present disclosure.

FIG. 12 shows a block diagram 1200 of a communications manager 1220 that supports multi-cluster low PAPR waveform design in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of multi-cluster low PAPR waveform design as described herein. For example, the communications manager 1220 may include a waveform reception manager 1225, an FFT manager 1230, an inverse DFT manager 1235, a codeword manager 1240, a resource element block manager 1245, a resource element index manager 1250, a resource element interleaving manager 1255, a UE capability manager 1260, a DFT configuration manager 1265, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a wireless device in accordance with examples as disclosed herein. The waveform reception manager 1225 may be configured as or otherwise support a means for receiving a time domain waveform on a first set of frequency resources and a second set of frequency resources, the second set of frequency resources separated in frequency from the first set of frequency resources. The FFT manager 1230 may be configured as or otherwise support a means for performing, on the time domain waveform, an FFT to obtain a first set of frequency domain samples associated with the first set of frequency resources and a second set of frequency domain samples associated with the second set of frequency resources. The inverse DFT manager 1235 may be configured as or otherwise support a means for performing a first inverse DFT on the first set of frequency domain samples to generate a first set of modulation symbols. In some examples, the inverse DFT manager 1235 may be configured as or otherwise support a means for performing a second inverse DFT on the second set of frequency domain samples to generate a second set of modulation symbols. The codeword manager 1240 may be configured as or otherwise support a means for obtaining a third set of modulation symbols associated with a codeword, the third set of modulation symbols including a first subset of modulation symbols extracted from the first set of modulation symbols and a second subset of modulation symbols extracted from the second set of modulation symbols.

In some examples, the resource element block manager 1245 may be configured as or otherwise support a means for extracting, from the first set of modulation symbols, the first subset of modulation symbols from a first block of resource elements. In some examples, the resource element block manager 1245 may be configured as or otherwise support a means for extracting, from the second set of modulation symbols, the second subset of modulation symbols a second block of resource elements.

In some examples, the resource element index manager 1250 may be configured as or otherwise support a means for extracting, from the first set of modulation symbols, the first subset of modulation symbols from odd-indexed resource elements. In some examples, the resource element index manager 1250 may be configured as or otherwise support a means for extracting, from the second set of modulation symbols, the second subset of modulation symbols from even-indexed resource elements.

In some examples, the resource element interleaving manager 1255 may be configured as or otherwise support a means for extracting, from the first set of modulation symbols, the first subset of modulation symbols from a first set of resource elements that are interleaved with a second set of resource elements. In some examples, the resource element interleaving manager 1255 may be configured as or otherwise support a means for extracting, from the second set of modulation symbols, the second subset of modulation symbols from the second set of resource elements that are interleaved with the first set of resource elements.

In some examples, the first set of modulation symbols further includes a first set of substitute modulation symbols that include zero power modulation symbols and the second set of modulation symbols further includes a second set of substitute modulation symbols that include zero power modulation symbols.

In some examples, the first set of modulation symbols further includes a first set of substitute modulation symbols associated with a different receiving wireless device and the second set of modulation symbols further includes a second set of substitute modulation symbols associated with the different receiving wireless device.

In some examples, the first subset of modulation symbols includes a different number of modulation symbols than the second subset of modulation symbols.

In some examples, both the first inverse DFT and the second inverse DFT are associated with a number of points, and the number of points is equal to a number of modulation symbols of the third set of modulation symbols.

In some examples, the wireless device is a network entity, and the UE capability manager 1260 may be configured as or otherwise support a means for receiving UE capability signaling indicating a capability of a UE to perform a first DFT and a second DFT for frequency resources separated in frequency. In some examples, the wireless device is a network entity, and the DFT configuration manager 1265 may be configured as or otherwise support a means for transmitting, at least in part in response to the UE capability signaling, control signaling indicating a configuration for the UE to perform the first DFT and the second DFT for the frequency resources.

In some examples, the wireless device is a UE, and the UE capability manager 1260 may be configured as or otherwise support a means for transmitting, to a network entity, UE capability signaling indicating a capability of the UE to perform the first inverse DFT and the second inverse DFT for frequency resources separated in frequency. In some examples, the wireless device is a UE, and the DFT configuration manager 1265 may be configured as or otherwise support a means for receiving, based at least in part in response to the UE capability signaling, control signaling indicating a configuration for performing the first inverse DFT and the second inverse DFT for the frequency resources.

In some examples, the time domain waveform includes a DFT spread frequency division multiplexing waveform.

Figure 13:
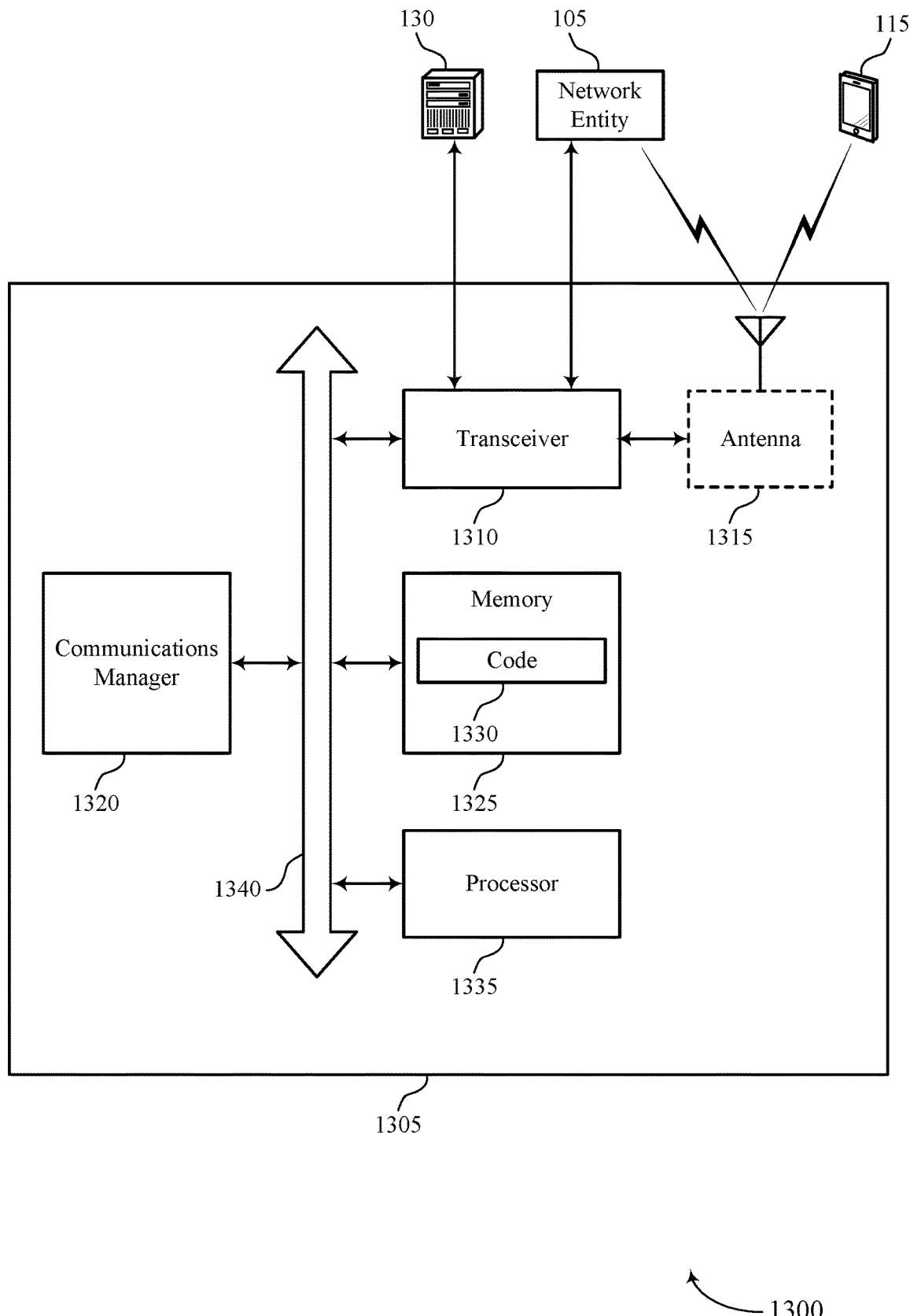
FIG. 13 shows a diagram of a system including a device that supports multi-cluster low peak to average power ratio waveform design in accordance with one or more aspects of the present disclosure.

FIG. 13 shows a diagram of a system 1300 including a device 1305 that supports multi-cluster low PAPR waveform design in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting multi-cluster low PAPR waveform design). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a wireless device in accordance with examples as disclosed herein. For example, the communications manager 1320 may be configured as or otherwise support a means for receiving a time domain waveform on a first set of frequency resources and a second set of frequency resources, the second set of frequency resources separated in frequency from the first set of frequency resources. The communications manager 1320 may be configured as or otherwise support a means for performing, on the time domain waveform, an FFT to obtain a first set of frequency domain samples associated with the first set of frequency resources and a second set of frequency domain samples associated with the second set of frequency resources. The communications manager 1320 may be configured as or otherwise support a means for performing a first inverse DFT on the first set of frequency domain samples to generate a first set of modulation symbols. The communications manager 1320 may be configured as or otherwise support a means for performing a second inverse DFT on the second set of frequency domain samples to generate a second set of modulation symbols. The communications manager 1320 may be configured as or otherwise support a means for obtaining a third set of modulation symbols associated with a codeword, the third set of modulation symbols including a first subset of modulation symbols extracted from the first set of modulation symbols and a second subset of modulation symbols extracted from the second set of modulation symbols.

By including or configuring the communications manager 1320 in accordance with examples as described herein, the device 1305 may support techniques for improved communication reliability, more efficient utilization of communication resources, improved coordination between devices, and improved utilization of processing capability by enabling transmission of low PAPR waveforms using non-contiguous frequency domain resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of multi-cluster low PAPR waveform design as described herein, or the processor 1335 and the memory 1325 may be otherwise configured to perform or support such operations.

Figure 14:
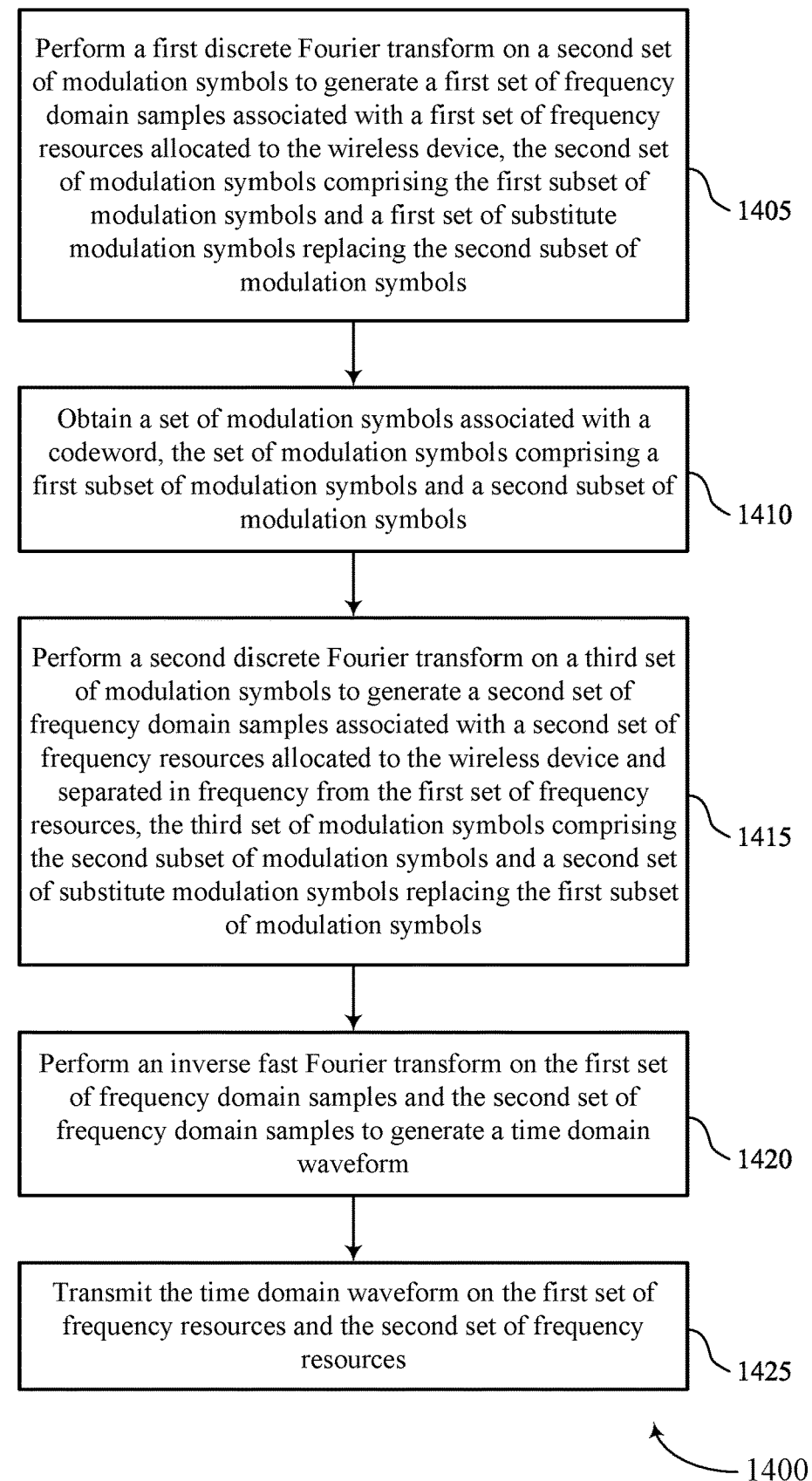
FIGS. 14 through 21 show flowcharts illustrating methods that support multi-cluster low peak to average power ratio waveform design in accordance with one or more aspects of the present disclosure.

FIG. 14 shows a flowchart illustrating a method 1400 that supports multi-cluster low PAPR waveform design in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The operations of 1405 may be performed in accordance with examples as disclosed herein. In some examples, aspects of the operations of 1405 may be performed by a DFT manager 830 as described with reference to FIG. 8.

At 1410, the method may include obtaining a set of modulation symbols associated with a codeword, the set of modulation symbols including a first subset of modulation symbols and a second subset of modulation symbols. The operations of 1410 may be performed in accordance with examples as disclosed herein. In some examples, aspects of the operations of 1410 may be performed by a codeword manager 825 as described with reference to FIG. 8.

At 1415, the method may include performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The operations of 1415 may be performed in accordance with examples as disclosed herein. In some examples, aspects of the operations of 1415 may be performed by a DFT manager 830 as described with reference to FIG. 8.

At 1420, the method may include performing an IFFT on the first set of frequency domain samples and the second set of frequency domain samples to generate a time domain waveform. The operations of 1420 may be performed in accordance with examples as disclosed herein. In some examples, aspects of the operations of 1420 may be performed by an inverse FFT manager 835 as described with reference to FIG. 8.

At 1425, the method may include transmitting the time domain waveform on the first set of frequency resources and the second set of frequency resources. The operations of 1425 may be performed in accordance with examples as disclosed herein. In some examples, aspects of the operations of 1425 may be performed by a waveform transmission manager 840 as described with reference to FIG. 8.

Figure 15:
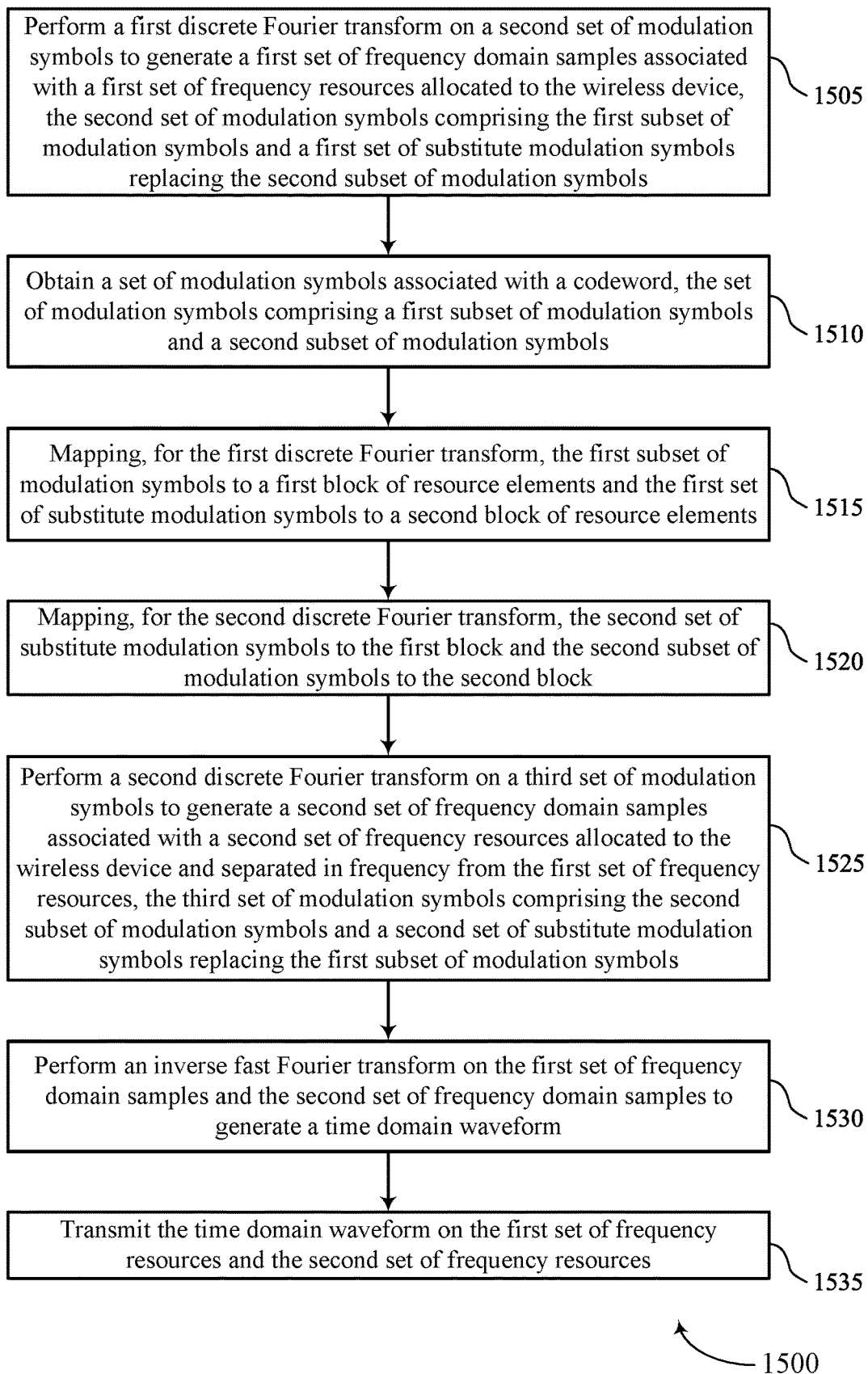

FIG. 15 shows a flowchart illustrating a method 1500 that supports multi-cluster low PAPR waveform design in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The operations of 1505 may be performed in accordance with examples as disclosed herein. In some examples, aspects of the operations of 1505 may be performed by a DFT manager 830 as described with reference to FIG. 8.

At 1510, the method may include obtaining a set of modulation symbols associated with a codeword, the set of modulation symbols including a first subset of modulation symbols and a second subset of modulation symbols. The operations of 1510 may be performed in accordance with examples as disclosed herein. In some examples, aspects of the operations of 1510 may be performed by a codeword manager 825 as described with reference to FIG. 8.

At 1515, the method may include mapping, for the first DFT, the first subset of modulation symbols to a first block of resource elements and the first set of substitute modulation symbols to a second block of resource elements. The operations of 1515 may be performed in accordance with examples as disclosed herein. In some examples, aspects of the operations of 1515 may be performed by a resource element block manager 845 as described with reference to FIG. 8.

At 1520, the method may include mapping, for the second DFT, the second set of substitute modulation symbols to the first block and the second subset of modulation symbols to the second block. The operations of 1520 may be performed in accordance with examples as disclosed herein. In some examples, aspects of the operations of 1520 may be performed by a resource element block manager 845 as described with reference to FIG. 8.

At 1525, the method may include performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The operations of 1525 may be performed in accordance with examples as disclosed herein. In some examples, aspects of the operations of 1525 may be performed by a DFT manager 830 as described with reference to FIG. 8.

At 1530, the method may include performing an IFFT on the first set of frequency domain samples and the second set of frequency domain samples to generate a time domain waveform. The operations of 1530 may be performed in accordance with examples as disclosed herein. In some examples, aspects of the operations of 1530 may be performed by an inverse FFT manager 835 as described with reference to FIG. 8.

At 1535, the method may include transmitting the time domain waveform on the first set of frequency resources and the second set of frequency resources. The operations of 1535 may be performed in accordance with examples as disclosed herein. In some examples, aspects of the operations of 1535 may be performed by a waveform transmission manager 840 as described with reference to FIG. 8.

Figure 16:
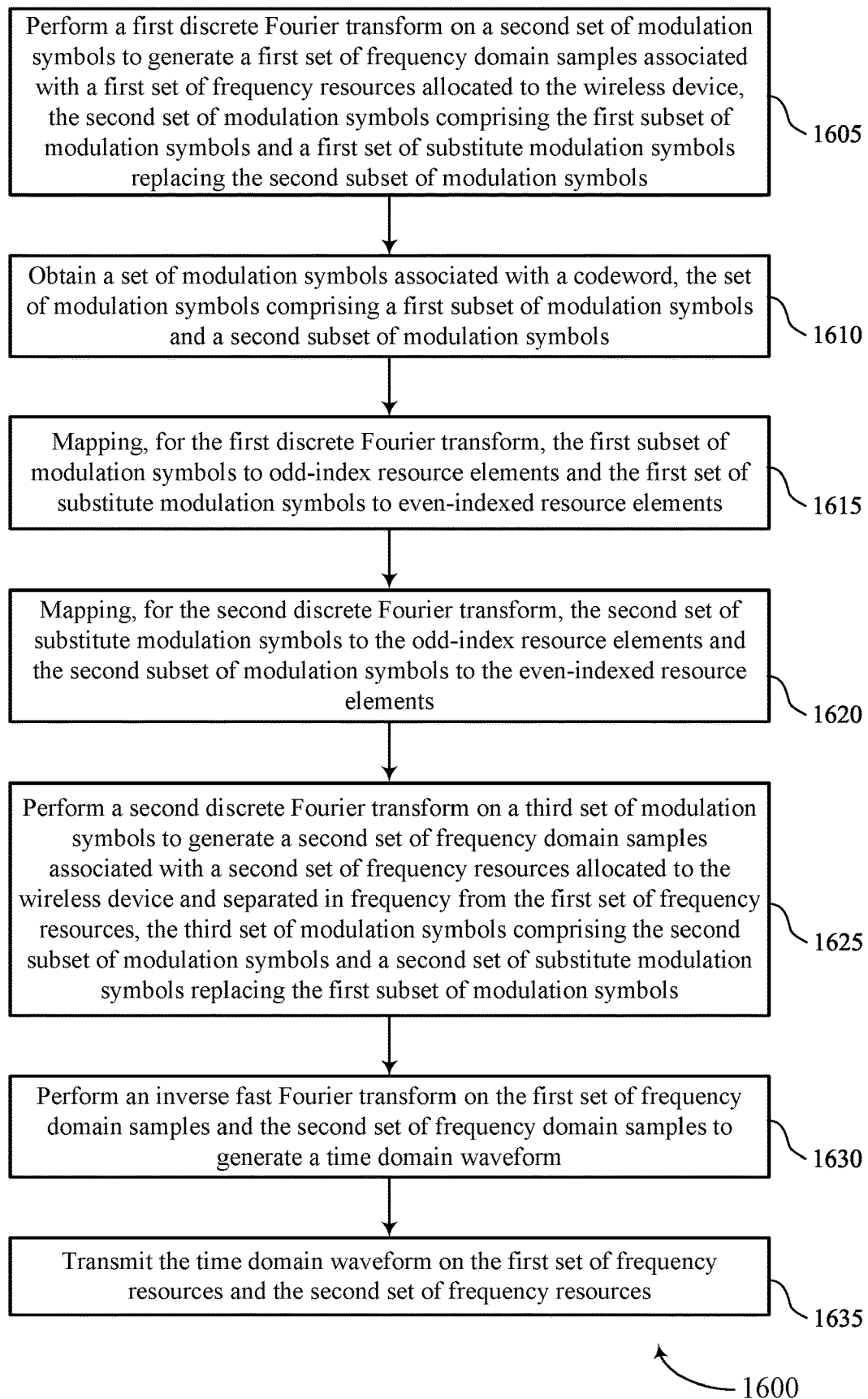

FIG. 16 shows a flowchart illustrating a method 1600 that supports multi-cluster low PAPR waveform design in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The operations of 1605 may be performed in accordance with examples as disclosed herein. In some examples, aspects of the operations of 1605 may be performed by a DFT manager 830 as described with reference to FIG. 8.

At 1610, the method may include obtaining a set of modulation symbols associated with a codeword, the set of modulation symbols including a first subset of modulation symbols and a second subset of modulation symbols. The operations of 1610 may be performed in accordance with examples as disclosed herein. In some examples, aspects of the operations of 1610 may be performed by a codeword manager 825 as described with reference to FIG. 8.

At 1615, the method may include mapping, for the first DFT, the first subset of modulation symbols to odd-indexed resource elements and the first set of substitute modulation symbols to even-indexed resource elements. The operations of 1615 may be performed in accordance with examples as disclosed herein. In some examples, aspects of the operations of 1615 may be performed by a resource element index manager 850 as described with reference to FIG. 8.

At 1620, the method may include mapping, for the second DFT, the second set of substitute modulation symbols to the odd-indexed resource elements and the second subset of modulation symbols to the even-indexed resource elements. The operations of 1620 may be performed in accordance with examples as disclosed herein. In some examples, aspects of the operations of 1620 may be performed by a resource element index manager 850 as described with reference to FIG. 8.

At 1625, the method may include performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The operations of 1625 may be performed in accordance with examples as disclosed herein. In some examples, aspects of the operations of 1625 may be performed by a DFT manager 830 as described with reference to FIG. 8.

At 1630, the method may include performing an IFFT on the first set of frequency domain samples and the second set of frequency domain samples to generate a time domain waveform. The operations of 1630 may be performed in accordance with examples as disclosed herein. In some examples, aspects of the operations of 1630 may be performed by an inverse FFT manager 835 as described with reference to FIG. 8.

At 1635, the method may include transmitting the time domain waveform on the first set of frequency resources and the second set of frequency resources. The operations of 1635 may be performed in accordance with examples as disclosed herein. In some examples, aspects of the operations of 1635 may be performed by a waveform transmission manager 840 as described with reference to FIG. 8.

Figure 17:
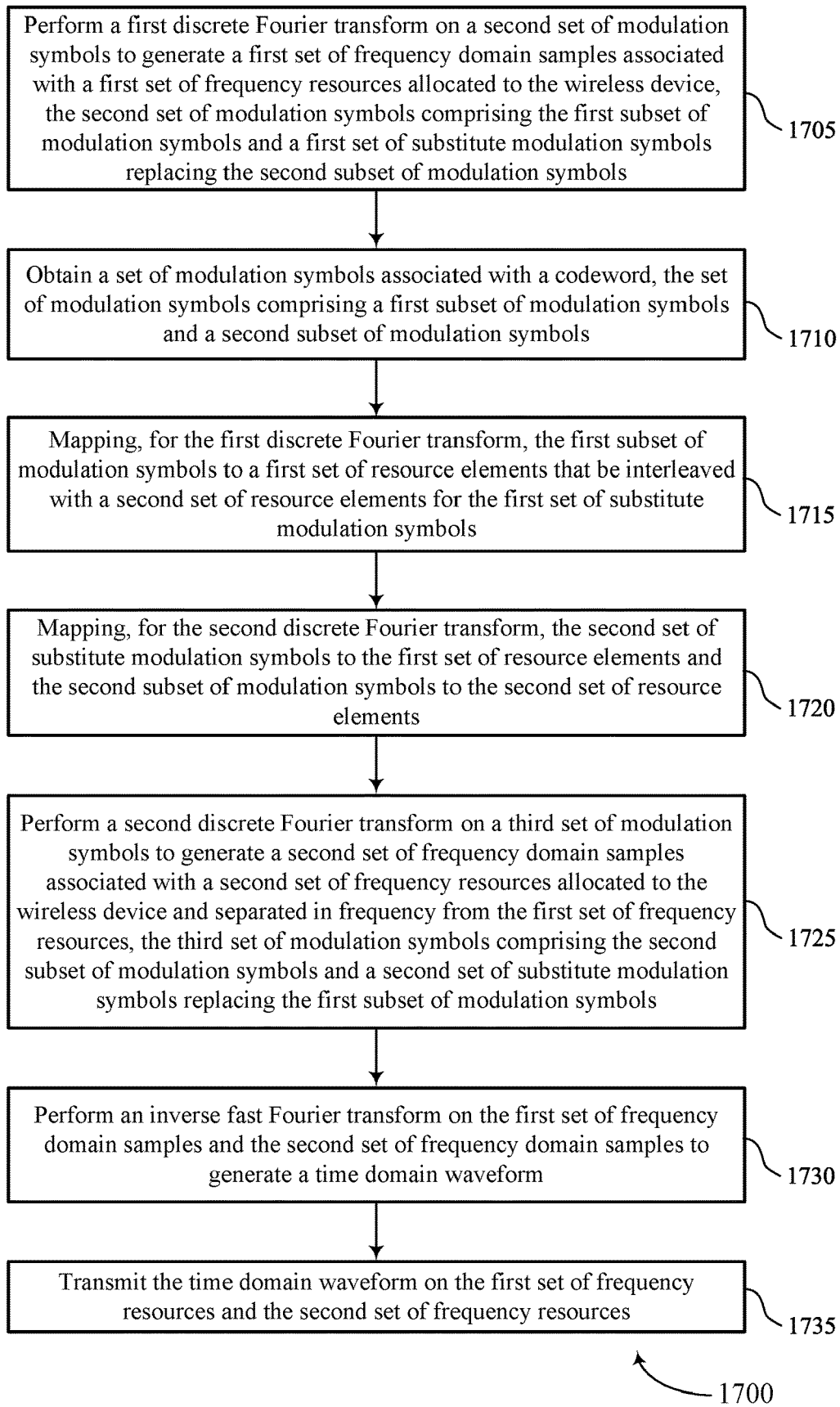

FIG. 17 shows a flowchart illustrating a method 1700 that supports multi-cluster low PAPR waveform design in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include performing a first DFT on a second set of modulation symbols to generate a first set of frequency domain samples associated with a first set of frequency resources allocated to the wireless device, the second set of modulation symbols including the first subset of modulation symbols and a first set of substitute modulation symbols replacing the second subset of modulation symbols. The operations of 1705 may be performed in accordance with examples as disclosed herein. In some examples, aspects of the operations of 1705 may be performed by a DFT manager 830 as described with reference to FIG. 8.

At 1710, the method may include obtaining a set of modulation symbols associated with a codeword, the set of modulation symbols including a first subset of modulation symbols and a second subset of modulation symbols. The operations of 1710 may be performed in accordance with examples as disclosed herein. In some examples, aspects of the operations of 1710 may be performed by a codeword manager 825 as described with reference to FIG. 8.

At 1715, the method may include mapping, for the first DFT, the first subset of modulation symbols to a first set of resource elements that are interleaved with a second set of resource elements for the first set of substitute modulation symbols. The operations of 1715 may be performed in accordance with examples as disclosed herein. In some examples, aspects of the operations of 1715 may be performed by a resource element interleaving manager 855 as described with reference to FIG. 8.

At 1720, the method may include mapping, for the second DFT, the second set of substitute modulation symbols to the first set of resource elements and the second subset of modulation symbols to the second set of resource elements. The operations of 1720 may be performed in accordance with examples as disclosed herein. In some examples, aspects of the operations of 1720 may be performed by a resource element interleaving manager 855 as described with reference to FIG. 8.

At 1725, the method may include performing a second DFT on a third set of modulation symbols to generate a second set of frequency domain samples associated with a second set of frequency resources allocated to the wireless device and separated in frequency from the first set of frequency resources, the third set of modulation symbols including the second subset of modulation symbols and a second set of substitute modulation symbols replacing the first subset of modulation symbols. The operations of 1725 may be performed in accordance with examples as disclosed herein. In some examples, aspects of the operations of 1725 may be performed by a DFT manager 830 as described with reference to FIG. 8.

At 1730, the method may include performing an IFFT on the first set of frequency domain samples and the second set of frequency domain samples to generate a time domain waveform. The operations of 1730 may be performed in accordance with examples as disclosed herein. In some examples, aspects of the operations of 1730 may be performed by an inverse FFT manager 835 as described with reference to FIG. 8.

At 1735, the method may include transmitting the time domain waveform on the first set of frequency resources and the second set of frequency resources. The operations of 1735 may be performed in accordance with examples as disclosed herein. In some examples, aspects of the operations of 1735 may be performed by a waveform transmission manager 840 as described with reference to FIG. 8.

Figure 18:
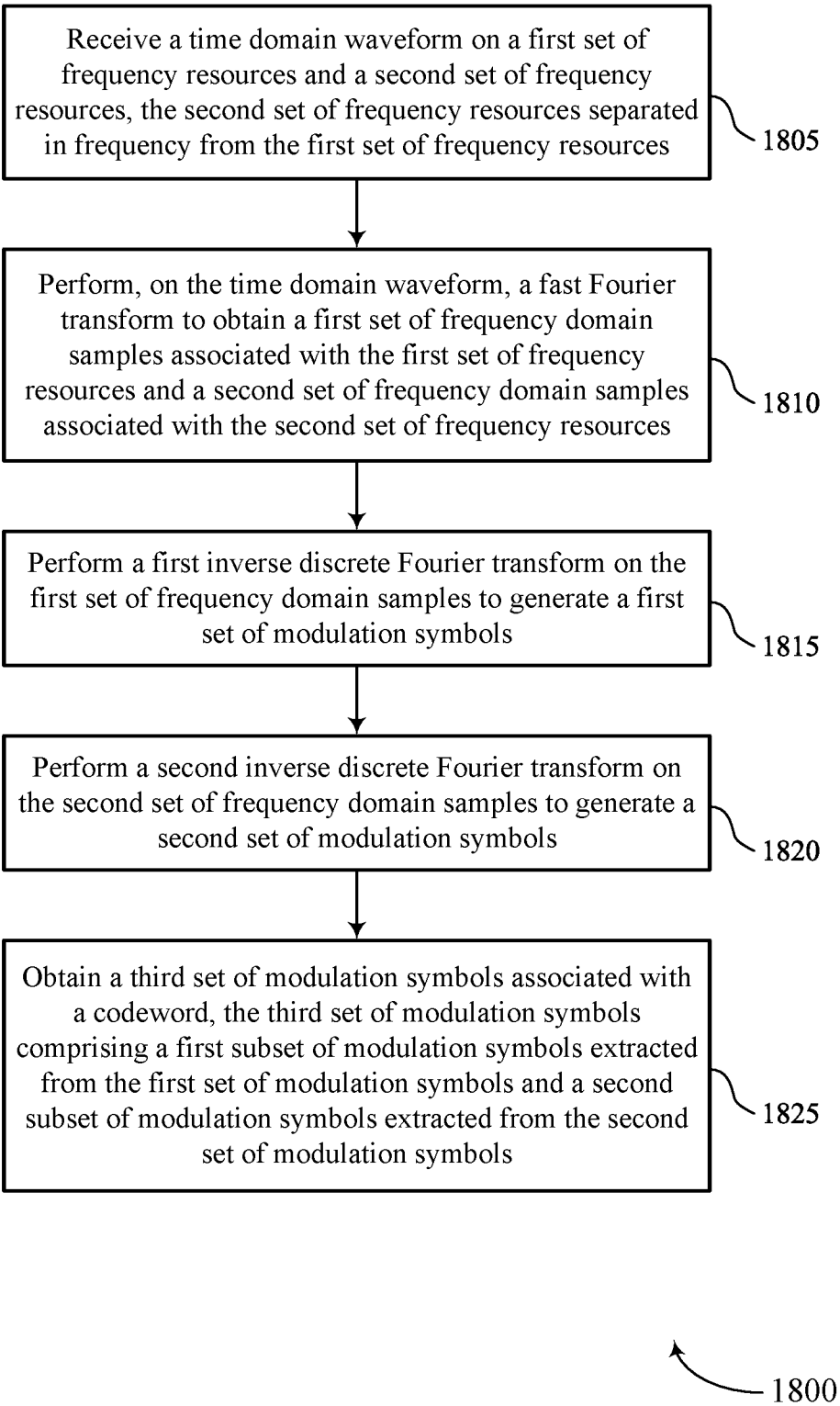

FIG. 18 shows a flowchart illustrating a method 1800 that supports multi-cluster low PAPR waveform design in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving a time domain waveform on a first set of frequency resources and a second set of frequency resources, the second set of frequency resources separated in frequency from the first set of frequency resources. The operations of 1805 may be performed in accordance with examples as disclosed herein. In some examples, aspects of the operations of 1805 may be performed by a waveform reception manager 1225 as described with reference to FIG. 12.

At 1810, the method may include performing, on the time domain waveform, an FFT to obtain a first set of frequency domain samples associated with the first set of frequency resources and a second set of frequency domain samples associated with the second set of frequency resources. The operations of 1810 may be performed in accordance with examples as disclosed herein. In some examples, aspects of the operations of 1810 may be performed by an FFT manager 1230 as described with reference to FIG. 12.

At 1815, the method may include performing a first inverse DFT on the first set of frequency domain samples to generate a first set of modulation symbols. The operations of 1815 may be performed in accordance with examples as disclosed herein. In some examples, aspects of the operations of 1815 may be performed by an inverse DFT manager 1235 as described with reference to FIG. 12.

At 1820, the method may include performing a second inverse DFT on the second set of frequency domain samples to generate a second set of modulation symbols. The operations of 1820 may be performed in accordance with examples as disclosed herein. In some examples, aspects of the operations of 1820 may be performed by an inverse DFT manager 1235 as described with reference to FIG. 12.

At 1825, the method may include obtaining a third set of modulation symbols associated with a codeword, the third set of modulation symbols including a first subset of modulation symbols extracted from the first set of modulation symbols and a second subset of modulation symbols extracted from the second set of modulation symbols. The operations of 1825 may be performed in accordance with examples as disclosed herein. In some examples, aspects of the operations of 1825 may be performed by a codeword manager 1240 as described with reference to FIG. 12.

Figure 19:
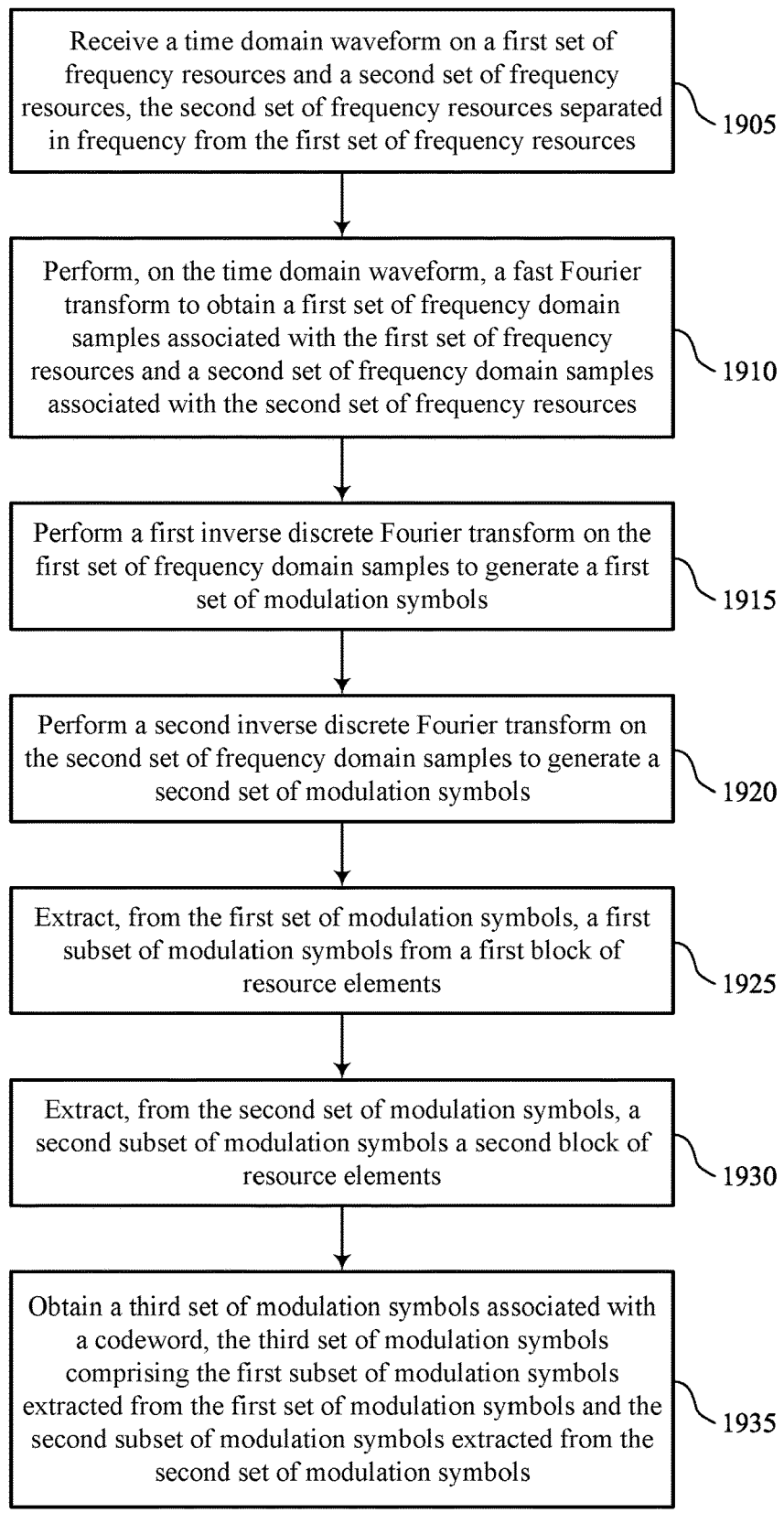

FIG. 19 shows a flowchart illustrating a method 1900 that supports multi-cluster low PAPR waveform design in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include receiving a time domain waveform on a first set of frequency resources and a second set of frequency resources, the second set of frequency resources separated in frequency from the first set of frequency resources. The operations of 1905 may be performed in accordance with examples as disclosed herein. In some examples, aspects of the operations of 1905 may be performed by a waveform reception manager 1225 as described with reference to FIG. 12.

At 1910, the method may include performing, on the time domain waveform, an FFT to obtain a first set of frequency domain samples associated with the first set of frequency resources and a second set of frequency domain samples associated with the second set of frequency resources. The operations of 1910 may be performed in accordance with examples as disclosed herein. In some examples, aspects of the operations of 1910 may be performed by an FFT manager 1230 as described with reference to FIG. 12.

At 1915, the method may include performing a first inverse DFT on the first set of frequency domain samples to generate a first set of modulation symbols. The operations of 1915 may be performed in accordance with examples as disclosed herein. In some examples, aspects of the operations of 1915 may be performed by an inverse DFT manager 1235 as described with reference to FIG. 12.

At 1920, the method may include performing a second inverse DFT on the second set of frequency domain samples to generate a second set of modulation symbols. The operations of 1920 may be performed in accordance with examples as disclosed herein. In some examples, aspects of the operations of 1920 may be performed by an inverse DFT manager 1235 as described with reference to FIG. 12.

At 1925, the method may include extracting, from the first set of modulation symbols, a first subset of modulation symbols from a first block of resource elements. The operations of 1925 may be performed in accordance with examples as disclosed herein. In some examples, aspects of the operations of 1925 may be performed by a resource element block manager 1245 as described with reference to FIG. 12.

At 1930, the method may include extracting, from the second set of modulation symbols, a second subset of modulation symbols a second block of resource elements. The operations of 1930 may be performed in accordance with examples as disclosed herein. In some examples, aspects of the operations of 1930 may be performed by a resource element block manager 1245 as described with reference to FIG. 12.

At 1935, the method may include obtaining a third set of modulation symbols associated with a codeword, the third set of modulation symbols including the first subset of modulation symbols extracted from the first set of modulation symbols and the second subset of modulation symbols extracted from the second set of modulation symbols. The operations of 1935 may be performed in accordance with examples as disclosed herein. In some examples, aspects of the operations of 1935 may be performed by a codeword manager 1240 as described with reference to FIG. 12.

Figure 20:
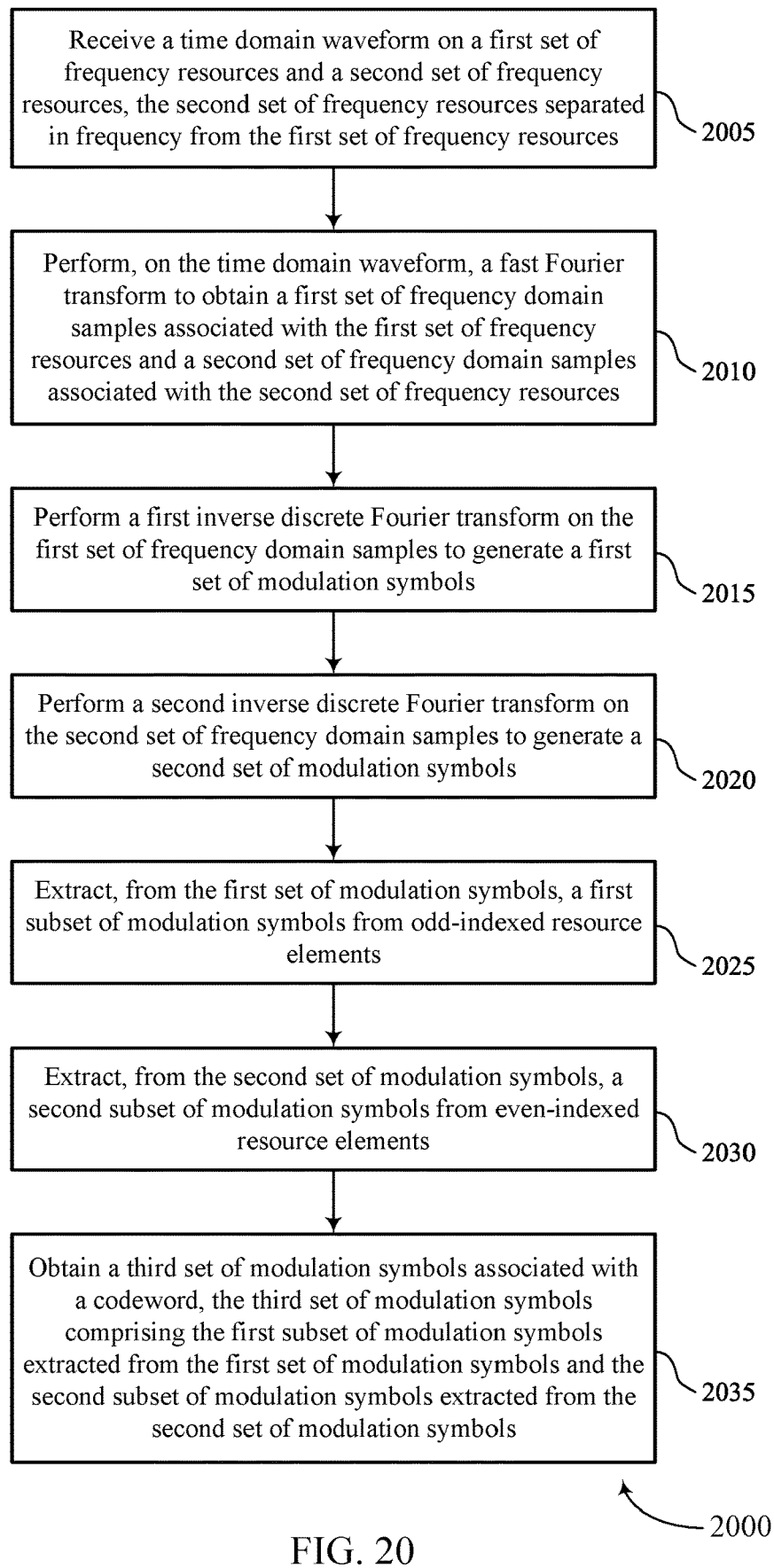

FIG. 20 shows a flowchart illustrating a method 2000 that supports multi-cluster low PAPR waveform design in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include receiving a time domain waveform on a first set of frequency resources and a second set of frequency resources, the second set of frequency resources separated in frequency from the first set of frequency resources. The operations of 2005 may be performed in accordance with examples as disclosed herein. In some examples, aspects of the operations of 2005 may be performed by a waveform reception manager 1225 as described with reference to FIG. 12.

At 2010, the method may include performing, on the time domain waveform, an FFT to obtain a first set of frequency domain samples associated with the first set of frequency resources and a second set of frequency domain samples associated with the second set of frequency resources. The operations of 2010 may be performed in accordance with examples as disclosed herein. In some examples, aspects of the operations of 2010 may be performed by an FFT manager 1230 as described with reference to FIG. 12.

At 2015, the method may include performing a first inverse DFT on the first set of frequency domain samples to generate a first set of modulation symbols. The operations of 2015 may be performed in accordance with examples as disclosed herein. In some examples, aspects of the operations of 2015 may be performed by an inverse DFT manager 1235 as described with reference to FIG. 12.

At 2020, the method may include performing a second inverse DFT on the second set of frequency domain samples to generate a second set of modulation symbols. The operations of 2020 may be performed in accordance with examples as disclosed herein. In some examples, aspects of the operations of 2020 may be performed by an inverse DFT manager 1235 as described with reference to FIG. 12.

At 2025, the method may include extracting, from the first set of modulation symbols, a first subset of modulation symbols from odd-indexed resource elements. The operations of 2025 may be performed in accordance with examples as disclosed herein. In some examples, aspects of the operations of 2025 may be performed by a resource element index manager 1250 as described with reference to FIG. 12.

At 2030, the method may include extracting, from the second set of modulation symbols, a second subset of modulation symbols from even-indexed resource elements. The operations of 2030 may be performed in accordance with examples as disclosed herein. In some examples, aspects of the operations of 2030 may be performed by a resource element index manager 1250 as described with reference to FIG. 12.

At 2035, the method may include obtaining a third set of modulation symbols associated with a codeword, the third set of modulation symbols including the first subset of modulation symbols extracted from the first set of modulation symbols and the second subset of modulation symbols extracted from the second set of modulation symbols. The operations of 2035 may be performed in accordance with examples as disclosed herein. In some examples, aspects of the operations of 2035 may be performed by a codeword manager 1240 as described with reference to FIG. 12.

Figure 21:
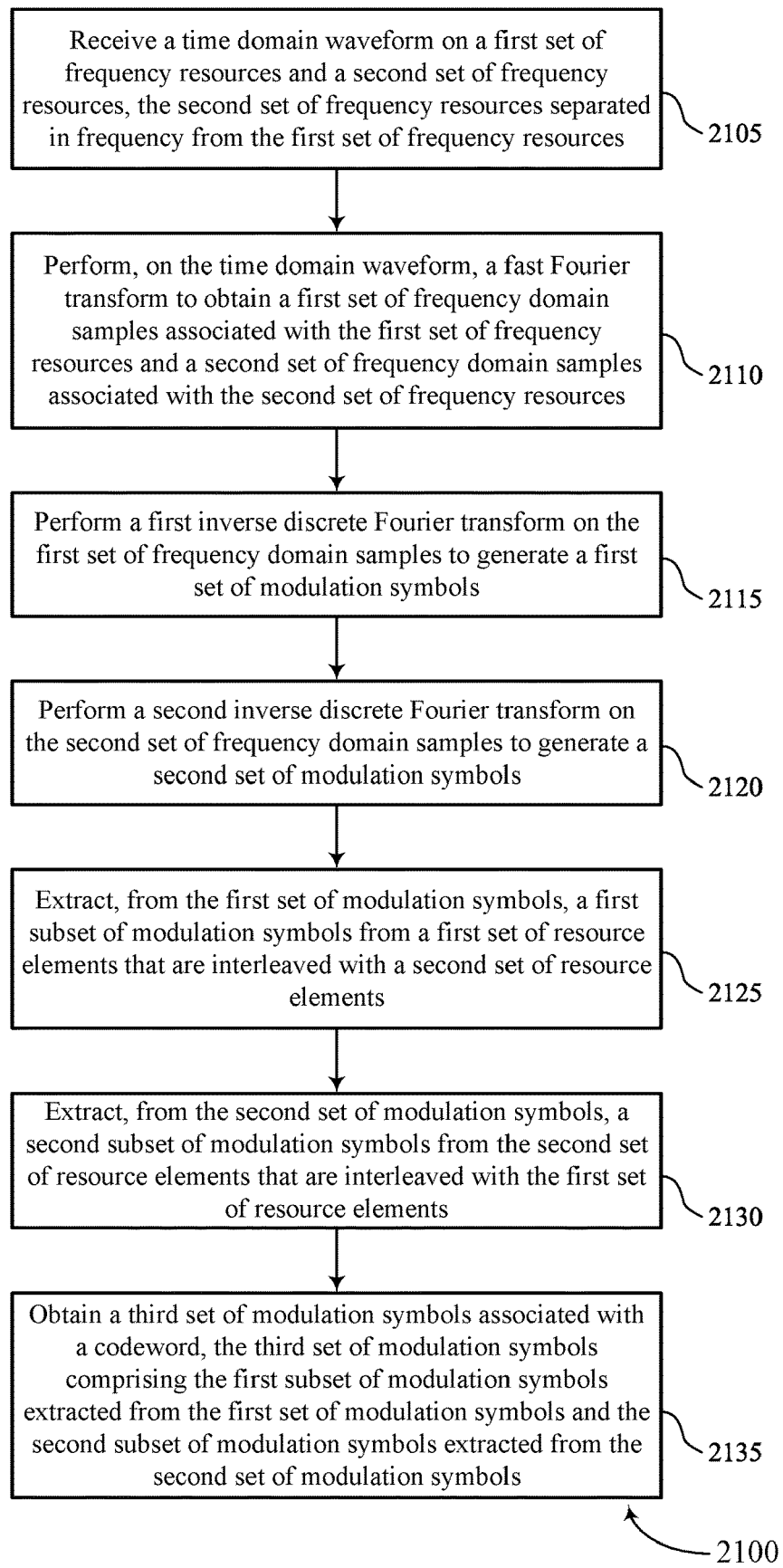

FIG. 21 shows a flowchart illustrating a method 2100 that supports multi-cluster low PAPR waveform design in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include receiving a time domain waveform on a first set of frequency resources and a second set of frequency resources, the second set of frequency resources separated in frequency from the first set of frequency resources. The operations of 2105 may be performed in accordance with examples as disclosed herein. In some examples, aspects of the operations of 2105 may be performed by a waveform reception manager 1225 as described with reference to FIG. 12.

At 2110, the method may include performing, on the time domain waveform, an FFT to obtain a first set of frequency domain samples associated with the first set of frequency resources and a second set of frequency domain samples associated with the second set of frequency resources. The operations of 2110 may be performed in accordance with examples as disclosed herein. In some examples, aspects of the operations of 2110 may be performed by an FFT manager 1230 as described with reference to FIG. 12.

At 2115, the method may include performing a first inverse DFT on the first set of frequency domain samples to generate a first set of modulation symbols. The operations of 2115 may be performed in accordance with examples as disclosed herein. In some examples, aspects of the operations of 2115 may be performed by an inverse DFT manager 1235 as described with reference to FIG. 12.

At 2120, the method may include performing a second inverse DFT on the second set of frequency domain samples to generate a second set of modulation symbols. The operations of 2120 may be performed in accordance with examples as disclosed herein. In some examples, aspects of the operations of 2120 may be performed by an inverse DFT manager 1235 as described with reference to FIG. 12.

At 2125, the method may include extracting, from the first set of modulation symbols, a first subset of modulation symbols from a first set of resource elements that are interleaved with a second set of resource elements. The operations of 2125 may be performed in accordance with examples as disclosed herein. In some examples, aspects of the operations of 2125 may be performed by a resource element interleaving manager 1255 as described with reference to FIG. 12.

At 2130, the method may include extracting, from the second set of modulation symbols, a second subset of modulation symbols from the second set of resource elements that are interleaved with the first set of resource elements. The operations of 2130 may be performed in accordance with examples as disclosed herein. In some examples, aspects of the operations of 2130 may be performed by a resource element interleaving manager 1255 as described with reference to FIG. 12.

At 2135, the method may include obtaining a third set of modulation symbols associated with a codeword, the third set of modulation symbols including the first subset of modulation symbols extracted from the first set of modulation symbols and the second subset of modulation symbols extracted from the second set of modulation symbols. The operations of 2135 may be performed in accordance with examples as disclosed herein. In some examples, aspects of the operations of 2135 may be performed by a codeword manager 1240 as described with reference to FIG. 12.

The following provides an overview of aspects of the present disclosure:

Aspect 1: A method for wireless communications at a wireless device, comprising: obtaining a set of modulation symbols associated with a codeword, the set of modulation symbols comprising a first subset of modulation symbols and a second subset of modulation symbols; performing a first DFT on a second set of modulation symbols to generate a first set of frequency domain samples associated with a first set of frequency resources allocated to the wireless device, the second set of modulation symbols comprising the first subset of modulation symbols and a first set of substitute modulation symbols replacing the second subset of modulation symbols; performing a second DFT on a third set of modulation symbols to generate a second set of frequency domain samples associated with a second set of frequency resources allocated to the wireless device and separated in frequency from the first set of frequency resources, the third set of modulation symbols comprising the second subset of modulation symbols and a second set of substitute modulation symbols replacing the first subset of modulation symbols; performing an IFFT on the first set of frequency domain samples and the second set of frequency domain samples to generate a time domain waveform; and transmitting the time domain waveform on the first set of frequency resources and the second set of frequency resources.

Aspect 2: The method of aspect 1, further comprising: mapping, for the first DFT, the first subset of modulation symbols to a first block of resource elements and the first set of substitute modulation symbols to a second block of resource elements; and mapping, for the second DFT, the second set of substitute modulation symbols to the first block and the second subset of modulation symbols to the second block.

Aspect 3: The method of aspect 1, further comprising: mapping, for the first DFT, the first subset of modulation symbols to odd-indexed resource elements and the first set of substitute modulation symbols to even-indexed resource elements; and mapping, for the second DFT, the second set of substitute modulation symbols to the odd-indexed resource elements and the second subset of modulation symbols to the even-indexed resource elements.

Aspect 4: The method of aspect 1, further comprising: mapping, for the first DFT, the first subset of modulation symbols to a first set of resource elements that are interleaved with a second set of resource elements for the first set of substitute modulation symbols; and mapping, for the second DFT, the second set of substitute modulation symbols to the first set of resource elements and the second subset of modulation symbols to the second set of resource elements.

Aspect 5: The method of any of aspects 1 through 4, wherein the first set of substitute modulation symbols and the second set of substitute modulation symbols comprise zero power modulation symbols.

Aspect 6: The method of any of aspects 1 through 5, wherein the time domain waveform is transmitted to a second wireless device, the first set of substitute modulation symbols are associated with a transmission to a third wireless device, and the second set of substitute modulation symbols are associated with the transmission to the third wireless device.

Aspect 7: The method of any of aspects 1 through 6, wherein the first subset of modulation symbols comprises a different number of modulation symbols than the second subset of modulation symbols.

Aspect 8: The method of any of aspects 1 through 7, wherein performing the first DFT and performing the second DFT comprises: performing the first DFT associated with a number of points and the second DFT associated with the number of points, the number of points equal to a number of modulation symbols of the set of modulation symbols.

Aspect 9: The method of any of aspects 1 through 8, wherein the wireless device is a UE, the method further comprising: transmitting UE capability signaling indicating a capability of the UE to perform the first DFT and the second DFT for frequency resources separated in frequency; and receiving, at least in part in response to the UE capability signaling, control signaling indicating a configuration for performing the first DFT and the second DFT for the frequency resources.

Aspect 10: The method of any of aspects 1 through 9, wherein the wireless device is a network entity, further comprising: receiving, from a UE, UE capability signaling indicating a capability of the UE to perform a first inverse DFT and a second inverse DFT for frequency resources separated in frequency; and transmitting, at least in part in response to the UE capability signaling, control signaling indicating a configuration for performing the first inverse DFT and the second inverse DFT for the frequency resources.

Aspect 11: The method of any of aspects 1 through 10, wherein the time domain waveform comprises a DFT spread frequency division multiplexing waveform.

Aspect 12: A method for wireless communications at a wireless device, comprising: receiving a time domain waveform on a first set of frequency resources and a second set of frequency resources, the second set of frequency resources separated in frequency from the first set of frequency resources; performing, on the time domain waveform, an FFT to obtain a first set of frequency domain samples associated with the first set of frequency resources and a second set of frequency domain samples associated with the second set of frequency resources; performing a first inverse DFT on the first set of frequency domain samples to generate a first set of modulation symbols; performing a second inverse DFT on the second set of frequency domain samples to generate a second set of modulation symbols; and obtaining a third set of modulation symbols associated with a codeword, the third set of modulation symbols comprising a first subset of modulation symbols extracted from the first set of modulation symbols and a second subset of modulation symbols extracted from the second set of modulation symbols.

Aspect 13: The method of aspect 12, further comprising: extracting, from the first set of modulation symbols, the first subset of modulation symbols from a first block of resource elements; and extracting, from the second set of modulation symbols, the second subset of modulation symbols a second block of resource elements.

Aspect 14: The method of aspect 12, further comprising: extracting, from the first set of modulation symbols, the first subset of modulation symbols from odd-indexed resource elements; and extracting, from the second set of modulation symbols, the second subset of modulation symbols from even-indexed resource elements.

Aspect 15: The method of aspect 12, further comprising: extracting, from the first set of modulation symbols, the first subset of modulation symbols from a first set of resource elements that are interleaved with a second set of resource elements; and extracting, from the second set of modulation symbols, the second subset of modulation symbols from the second set of resource elements that are interleaved with the first set of resource elements.

Aspect 16: The method of any of aspects 12 through 15, wherein the first set of modulation symbols further comprises a first set of substitute modulation symbols that comprise zero power modulation symbols and the second set of modulation symbols further comprises a second set of substitute modulation symbols that comprise zero power modulation symbols.

Aspect 17: The method of any of aspects 12 through 16, wherein the first set of modulation symbols further comprises a first set of substitute modulation symbols associated with a different receiving wireless device and the second set of modulation symbols further comprises a second set of substitute modulation symbols associated with the different receiving wireless device.

Aspect 18: The method of any of aspects 12 through 17, wherein the first subset of modulation symbols comprises a different number of modulation symbols than the second subset of modulation symbols.

Aspect 19: The method of any of aspects 12 through 18, wherein both the first inverse DFT and the second inverse DFT are associated with a number of points, and the number of points is equal to a number of modulation symbols of the third set of modulation symbols.

Aspect 20: The method of any of aspects 12 through 19, wherein the wireless device is a network entity, the method further comprising: receiving UE capability signaling indicating a capability of a UE to perform a first DFT and a second DFT for frequency resources separated in frequency; and transmitting, at least in part in response to the UE capability signaling, control signaling indicating a configuration for the UE to perform the first DFT and the second DFT for the frequency resources.

Aspect 21: The method of any of aspects 12 through 20, wherein the wireless device is a UE, the method further comprising: transmitting, to a network entity, UE capability signaling indicating a capability of the UE to perform the first inverse DFT and the second inverse DFT for frequency resources separated in frequency; and receiving, based at least in part in response to the UE capability signaling, control signaling indicating a configuration for performing the first inverse DFT and the second inverse DFT for the frequency resources.

Aspect 22: The method of any of aspects 12 through 21, wherein the time domain waveform comprises a DFT spread frequency division multiplexing waveform.

Aspect 23: An apparatus for wireless communications at a wireless device, comprising a processor; memory coupled with the processor; and instructions stored in the memory and executable by the processor to cause the apparatus to perform a method of any of aspects 1 through 11.

Aspect 24: An apparatus for wireless communications at a wireless device, comprising at least one means for performing a method of any of aspects 1 through 11.

Aspect 25: A non-transitory computer-readable medium storing code for wireless communications at a wireless device, the code comprising instructions executable by a processor to perform a method of any of aspects 1 through 11.

Aspect 26: An apparatus for wireless communications at a wireless device, comprising a processor; memory coupled with the processor; and instructions stored in the memory and executable by the processor to cause the apparatus to perform a method of any of aspects 12 through 22.

Aspect 27: An apparatus for wireless communications at a wireless device, comprising at least one means for performing a method of any of aspects 12 through 22.

Aspect 28: A non-transitory computer-readable medium storing code for wireless communications at a wireless device, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless device, comprising:
   obtaining a set of modulation symbols associated with a codeword, the set of modulation symbols comprising a first subset of modulation symbols and a second subset of modulation symbols;
   performing a first discrete Fourier transform on a second set of modulation symbols to generate a first set of frequency domain samples associated with a first set of frequency resources allocated to the wireless device, the second set of modulation symbols comprising the first subset of modulation symbols and a first set of substitute modulation symbols replacing the second subset of modulation symbols;
   performing a second discrete Fourier transform on a third set of modulation symbols to generate a second set of frequency domain samples associated with a second set of frequency resources allocated to the wireless device and separated in frequency from the first set of frequency resources, the third set of modulation symbols comprising the second subset of modulation symbols and a second set of substitute modulation symbols replacing the first subset of modulation symbols;
   performing an inverse fast Fourier transform on the first set of frequency domain samples and the second set of frequency domain samples to generate a time domain waveform; and
   transmitting the time domain waveform on the first set of frequency resources and the second set of frequency resources.

2. The method of claim 1, further comprising:
   mapping, for the first discrete Fourier transform, the first subset of modulation symbols to a first block of resource elements and the first set of substitute modulation symbols to a second block of resource elements; and
   mapping, for the second discrete Fourier transform, the second set of substitute modulation symbols to the first block and the second subset of modulation symbols to the second block.

3. The method of claim 1, further comprising:
   mapping, for the first discrete Fourier transform, the first subset of modulation symbols to odd-indexed resource elements and the first set of substitute modulation symbols to even-indexed resource elements; and
   mapping, for the second discrete Fourier transform, the second set of substitute modulation symbols to the odd-indexed resource elements and the second subset of modulation symbols to the even-indexed resource elements.

4. The method of claim 1, further comprising:
mapping, for the first discrete Fourier transform, the first subset of modulation symbols to a first set of resource elements that are interleaved with a second set of resource elements for the first set of substitute modulation symbols; and
mapping, for the second discrete Fourier transform, the second set of substitute modulation symbols to the first set of resource elements and the second subset of modulation symbols to the second set of resource elements.

5. The method of claim 1, wherein the first set of substitute modulation symbols and the second set of substitute modulation symbols comprise zero power modulation symbols.

6. The method of claim 1, wherein the time domain waveform is transmitted to a second wireless device, the first set of substitute modulation symbols are associated with a transmission to a third wireless device, and the second set of substitute modulation symbols are associated with the transmission to the third wireless device.

7. The method of claim 1, wherein the first subset of modulation symbols comprises a different number of modulation symbols than the second subset of modulation symbols.

8. The method of claim 1, wherein performing the first discrete Fourier transform and performing the second discrete Fourier transform comprises:
performing the first discrete Fourier transform associated with a number of points and the second discrete Fourier transform associated with the number of points, the number of points equal to a number of modulation symbols of the set of modulation symbols.

9. The method of claim 1, wherein the wireless device is a user equipment (UE), the method further comprising:
transmitting UE capability signaling indicating a capability of the UE to perform the first discrete Fourier transform and the second discrete Fourier transform for frequency resources separated in frequency; and
receiving, at least in part in response to the UE capability signaling, control signaling indicating a configuration for performing the first discrete Fourier transform and the second discrete Fourier transform for the frequency resources.

10. The method of claim 1, wherein the wireless device is a network entity, further comprising:
receiving, from a user equipment (UE), UE capability signaling indicating a capability of the UE to perform a first inverse discrete Fourier transform and a second inverse discrete Fourier transform for frequency resources separated in frequency; and
transmitting, at least in part in response to the UE capability signaling, control signaling indicating a configuration for performing the first inverse discrete Fourier transform and the second inverse discrete Fourier transform for the frequency resources.

11. The method of claim 1, wherein the time domain waveform comprises a discrete Fourier transform spread frequency division multiplexing waveform.

12. A method for wireless communications at a wireless device, comprising:
receiving a time domain waveform on a first set of frequency resources and a second set of frequency resources, the second set of frequency resources separated in frequency from the first set of frequency resources;
performing, on the time domain waveform, a fast Fourier transform to obtain a first set of frequency domain samples associated with the first set of frequency resources and a second set of frequency domain samples associated with the second set of frequency resources;
performing a first inverse discrete Fourier transform on the first set of frequency domain samples to generate a first set of modulation symbols;
performing a second inverse discrete Fourier transform on the second set of frequency domain samples to generate a second set of modulation symbols; and
obtaining a third set of modulation symbols associated with a codeword, the third set of modulation symbols comprising a first subset of modulation symbols extracted from the first set of modulation symbols and a second subset of modulation symbols extracted from the second set of modulation symbols.

13. The method of claim 12, further comprising:
extracting, from the first set of modulation symbols, the first subset of modulation symbols from a first block of resource elements; and
extracting, from the second set of modulation symbols, the second subset of modulation symbols a second block of resource elements.

14. The method of claim 12, further comprising:
extracting, from the first set of modulation symbols, the first subset of modulation symbols from odd-indexed resource elements; and
extracting, from the second set of modulation symbols, the second subset of modulation symbols from even-indexed resource elements.

15. The method of claim 12, further comprising:
extracting, from the first set of modulation symbols, the first subset of modulation symbols from a first set of resource elements that are interleaved with a second set of resource elements; and
extracting, from the second set of modulation symbols, the second subset of modulation symbols from the second set of resource elements that are interleaved with the first set of resource elements.

16. The method of claim 12, wherein the first set of modulation symbols further comprises a first set of substitute modulation symbols that comprise zero power modulation symbols and the second set of modulation symbols further comprises a second set of substitute modulation symbols that comprise zero power modulation symbols.

17. The method of claim 12, wherein the first set of modulation symbols further comprises a first set of substitute modulation symbols associated with a different receiving wireless device and the second set of modulation symbols further comprises a second set of substitute modulation symbols associated with the different receiving wireless device.

18. The method of claim 12, wherein the first subset of modulation symbols comprises a different number of modulation symbols than the second subset of modulation symbols.

19. The method of claim 12, wherein both the first inverse discrete Fourier transform and the second inverse discrete Fourier transform are associated with a number of points, and the number of points is equal to a number of modulation symbols of the third set of modulation symbols.

20. The method of claim 12, wherein the wireless device is a network entity, the method further comprising:
receiving user equipment (UE) capability signaling indicating a capability of a UE to perform a first discrete Fourier transform and a second discrete Fourier transform for frequency resources separated in frequency; and
transmitting, at least in part in response to the UE capability signaling, control signaling indicating a configuration for the UE to perform the first discrete Fourier transform and the second discrete Fourier transform for the frequency resources.

21. The method of claim 12, wherein the wireless device is a user equipment (UE), the method further comprising:
transmitting, to a network entity, UE capability signaling indicating a capability of the UE to perform the first inverse discrete Fourier transform and the second inverse discrete Fourier transform for frequency resources separated in frequency; and
receiving, based at least in part in response to the UE capability signaling, control signaling indicating a configuration for performing the first inverse discrete Fourier transform and the second inverse discrete Fourier transform for the frequency resources.

22. The method of claim 12, wherein the time domain waveform comprises a discrete Fourier transform spread frequency division multiplexing waveform.

23. An apparatus for wireless communications at a wireless device, comprising:
a processor;
memory coupled with the processor; and
instructions stored in the memory and executable by the processor to cause the apparatus to:
obtain a set of modulation symbols associated with a codeword, the set of modulation symbols comprising a first subset of modulation symbols and a second subset of modulation symbols;
perform a first discrete Fourier transform on a second set of modulation symbols to generate a first set of frequency domain samples associated with a first set of frequency resources allocated to the wireless device, the second set of modulation symbols comprising the first subset of modulation symbols and a first set of substitute modulation symbols replacing the second subset of modulation symbols;
perform a second discrete Fourier transform on a third set of modulation symbols to generate a second set of frequency domain samples associated with a second set of frequency resources allocated to the wireless device and separated in frequency from the first set of frequency resources, the third set of modulation symbols comprising the second subset of modulation symbols and a second set of substitute modulation symbols replacing the first subset of modulation symbols;
perform an inverse fast Fourier transform on the first set of frequency domain samples and the second set of frequency domain samples to generate a time domain waveform; and
transmit the time domain waveform on the first set of frequency resources and the second set of frequency resources.

24. The apparatus of claim 23, wherein the instructions are further executable by the processor to cause the apparatus to:
mapping, for the first discrete Fourier transform, the first subset of modulation symbols to a first block of resource elements and the first set of substitute modulation symbols to a second block of resource elements; and
mapping, for the second discrete Fourier transform, the second set of substitute modulation symbols to the first block and the second subset of modulation symbols to the second block.

25. The apparatus of claim 23, wherein the instructions are further executable by the processor to cause the apparatus to:
mapping, for the first discrete Fourier transform, the first subset of modulation symbols to odd-index resource elements and the first set of substitute modulation symbols to even-indexed resource elements; and
mapping, for the second discrete Fourier transform, the second set of substitute modulation symbols to the odd-index resource elements and the second subset of modulation symbols to the even-indexed resource elements.

26. The apparatus of claim 23, wherein the instructions are further executable by the processor to cause the apparatus to:
mapping, for the first discrete Fourier transform, the first subset of modulation symbols to a first set of resource elements that be interleaved with a second set of resource elements for the first set of substitute modulation symbols; and
mapping, for the second discrete Fourier transform, the second set of substitute modulation symbols to the first set of resource elements and the second subset of modulation symbols to the second set of resource elements.

27. The apparatus of claim 23, wherein:
the first set of substitute modulation symbols and the second set of substitute modulation symbols comprise zero power modulation symbols.

28. The apparatus of claim 23, wherein the time domain waveform is transmitted to a second wireless device, the first set of substitute modulation symbols are associated with a transmission to a third wireless device, and the second set of substitute modulation symbols are associated with the transmission to the third wireless device.

29. The apparatus of claim 23, wherein the first subset of modulation symbols comprises a different number of modulation symbols than the second subset of modulation symbols.

30. An apparatus for wireless communications at a wireless device, comprising:
a processor;
memory coupled with the processor; and
instructions stored in the memory and executable by the processor to cause the apparatus to:
receive a time domain waveform on a first set of frequency resources and a second set of frequency resources, the second set of frequency resources separated in frequency from the first set of frequency resources;
perform, on the time domain waveform, a fast Fourier transform to obtain a first set of frequency domain samples associated with the first set of frequency resources and a second set of frequency domain samples associated with the second set of frequency resources;
perform a first inverse discrete Fourier transform on the first set of frequency domain samples to generate a first set of modulation symbols;

perform a second inverse discrete Fourier transform on the second set of frequency domain samples to generate a second set of modulation symbols; and obtain a third set of modulation symbols associated with a codeword, the third set of modulation symbols comprising a first subset of modulation symbols extracted from the first set of modulation symbols and a second subset of modulation symbols extracted from the second set of modulation symbols.

* * * * *